US012738580B2

(12) United States Patent
Shi et al.

(10) Patent No.: US 12,738,580 B2
(45) Date of Patent: Sep. 15, 2026

(54) BOX, BOX ASSEMBLY, BATTERY, AND ELECTRICAL DEVICE

(71) Applicant: CONTEMPORARY AMPEREX TECHNOLOGY (HONG KONG) LIMITED, Hong Kong (CN)

(72) Inventors: Weigang Shi, Ningde (CN); Zhi Wang, Ningde (CN); Wenchao Luo, Ningde (CN); Si Shi, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/021,242

(22) Filed: Jan. 15, 2025

(65) Prior Publication Data

US 2025/0158193 A1 May 15, 2025

Related U.S. Application Data

(63) Continuation of application No. PCT/CN2022/144239, filed on Dec. 30, 2022.

(51) Int. Cl.
*H01M 50/233* (2021.01)
*H01M 10/613* (2014.01)
(Continued)

(52) U.S. Cl.
CPC ....... *H01M 50/233* (2021.01); *H01M 10/613* (2015.04); *H01M 10/6556* (2015.04);
(Continued)

(58) Field of Classification Search
CPC ........... H01M 10/613; H01M 10/6556; H01M 50/233; H01M 50/249; H01M 50/262;
(Continued)

(56) References Cited

U.S. PATENT DOCUMENTS

2020/0127318 A1 4/2020 Chi et al.
2021/0126318 A1 4/2021 Jiang et al.
(Continued)

FOREIGN PATENT DOCUMENTS

CN 206490110 * 9/2017 ............. Y02E 60/10
CN 206490110 U 9/2017
(Continued)

OTHER PUBLICATIONS

English Translation of CN206490110.*
(Continued)

*Primary Examiner* — Kiran Quraishi Akhtar
(74) *Attorney, Agent, or Firm* — XSENSUS LLP

(57) ABSTRACT

This application provides a box, a box assembly, a battery, and an electrical device. The box includes: an end wall; a sidewall, where the sidewall encloses the end wall peripherally, and the sidewall and the end wall jointly define an accommodation space with an opening; and a first flange portion disposed at an end of the sidewall, the end being away from the end wall. The first flange portion at least partially protrudes beyond an inner surface of the sidewall. In the technical solution of this application, the first flange portion partially or fully protrudes beyond the inner surface of the sidewall of the box, so that the first flange portion can share a part of the accommodation space, thereby reducing the dimension by which the first flange portion extends out of the box, or preventing the first flange portion from extending out of the box.

16 Claims, 7 Drawing Sheets

(51) Int. Cl.

| | |
|---|---|
| ***H01M 10/6556*** | (2014.01) |
| ***H01M 50/204*** | (2021.01) |
| ***H01M 50/249*** | (2021.01) |
| ***H01M 50/262*** | (2021.01) |
| ***H01M 50/271*** | (2021.01) |

(52) U.S. Cl.
CPC ....... *H01M 50/249* (2021.01); *H01M 50/262* (2021.01); *H01M 50/271* (2021.01); *H01M 50/204* (2021.01)

(58) Field of Classification Search
CPC ............. H01M 50/271; H01M 50/204; H01M 2220/20; Y02E 60/10
See application file for complete search history.

(56) References Cited

U.S. PATENT DOCUMENTS

| | | | | |
|---|---|---|---|---|
| 2021/0242541 | A1 | 8/2021 | Sasaki et al. | |
| 2021/0320368 | A1 * | 10/2021 | Huang | H01M 50/242 |

FOREIGN PATENT DOCUMENTS

| | | | | |
|---|---|---|---|---|
| CN | 110137396 A | | 8/2019 | |
| CN | 111106268 | * | 5/2020 | H01M 10/613 |
| CN | 111106268 A | | 5/2020 | |
| CN | 112331976 A | | 2/2021 | |
| CN | 11447494 | * | 5/2022 | H01M 50/24 |
| CN | 114447494 A | | 5/2022 | |
| JP | 2018-193105 A | | 12/2018 | |

OTHER PUBLICATIONS

English Translation of CN111106268.*
English Translation of CN 11447494.*
International Search Report and Written Opinion mailed on Jul. 26, 2023, received for PCT Application PCT/CN2022/144239, filed on Dec. 30, 2022, 12 pages including English Translation.
Notification to Grant mailed on Apr. 4, 2023, received for CN Application 202223603315.4, 2 pages including English Translation.
Extended European Search Report issued Jul. 3, 2025 in European Patent Application No. 22969852.7.

* cited by examiner

BOX, BOX ASSEMBLY, BATTERY, AND ELECTRICAL DEVICE

CROSS-REFERENCE TO RELATED APPLICATION

This application is a continuation of International Application No. PCT/CN2022/144239, filed Dec. 30, 2022, the entire contents of which is incorporated herein by reference in its entirety.

TECHNICAL FIELD

This application relates to the technical field of batteries, and in particular, to a box, a box assembly, a battery, and an electrical device.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

In the battery technology, how to increase the energy density of a battery is a pressing technical challenge.

SUMMARY

This application provides a box, a box assembly, a battery, and an electrical device to effectively increase the energy density of the battery.

According to a first aspect, this application provides a box. The box includes: an end wall; a sidewall, where the sidewall encloses the end wall peripherally, and the sidewall and the end wall jointly define an accommodation space with an opening; and a first flange portion. The first flange portion is disposed at an end of the sidewall, the end being away from the end wall. The first flange portion at least partially protrudes beyond an inner surface of the sidewall.

In the technical solution of this application, the first flange portion of the sidewall of the box provides a connecting face for the box. The first flange portion partially or fully protrudes beyond the inner surface of the sidewall of the box, so that the first flange portion can share a part of the accommodation space, thereby reducing the dimension by which the first flange portion extends out of the box, or preventing the first flange portion from extending out of the box. This reduces the space occupied by the first flange portion outside the box or prevents the first flange portion from occupying the space outside the box. Therefore, the space originally reserved for the first flange portion outside the box can be incorporated into the box to increase the overall accommodation space of the box, reduce space waste, and improve the energy density and grouping efficiency of batteries that use the box.

According to some embodiments of this application, the first flange portion and the sidewall are formed in one piece.

In the above technical solution, the first flange portion and the sidewall are formed in one piece to increase the structural strength of the first flange portion and the overall box, and in turn, improve the structural stability of the box.

According to some embodiments of this application, a threaded hole is created on the first flange portion.

In the above technical solution, a threaded hole is created on the first flange portion. Through the threaded hole, it is convenient to connect the box to other accessories or fix the box to a carrier, thereby improving convenience of mounting the box.

According to some embodiments of this application, the first flange portion includes a first flange face oriented away from the end wall. A width of the first flange face is D, satisfying: 10 mm≤D≤30 mm.

In the above technical solution, a first flange face configured to connect the box is formed on the first flange portion on a side oriented away from the end wall. If the width of the first flange face is overly small, the width of a connecting region available from the first flange portion is overly small, thereby being unfavorable to improving the reliability of connecting or sealing the box. On the other hand, if the width of the first flange face is overly large, the width of the first flange portion is overly large, and the height by which the first flange portion protrudes beyond the inner surface of the sidewall is relatively large accordingly, thereby being prone to excessively block the opening of the accommodation space and cause inconvenience to mounting the battery cell into the box. Designing the width D of the first flange face to fall within the range of 10 mm to 30 mm can improve the connection reliability of the first flange face while preventing the first flange portion from excessively blocking the opening of the accommodation space, thereby efficiently utilizing the space inside the box and increasing the energy density of the battery that uses the box.

According to some embodiments of this application, the first flange portion includes a first flange face oriented away from the end wall. The first flange portion includes a first sub-portion and a second sub-portion. The first sub-portion is connected to the second sub-portion and the sidewall. Along a direction perpendicular to the first flange face, a thickness of the first sub-portion is greater than a thickness of the second sub-portion.

In the above technical solution, the first flange portion includes a second sub-portion and a first sub-portion thicker than the second sub-portion. The first sub-portion is connected to the sidewall and the second sub-portion. The first sub-portion reinforces the structure by increasing the thickness of the structure, thereby further increasing the structural strength of the first flange portion.

According to some embodiments of this application, a threaded hole is created on the first sub-portion.

In the above technical solution, the thickness of the first sub-portion is greater than the thickness of the second sub-portion, and the threaded hole is created on the first sub-portion, thereby increasing the processing depth of the threaded hole, and improving the connection stability of the box and the structural stability of the box subjected to force. Moreover, the threaded hole is created on the relatively thick first sub-portion of the first flange portion, thereby reducing the impact caused by the threaded hole on the structural strength of the first flange portion, and improving the structural strength and structural stability of the box.

According to some embodiments of this application, the sidewall includes two first sidewalls disposed opposite to each other along a first direction and two second sidewalls disposed opposite to each other along a second direction. The first direction is perpendicular to the second direction. The first flange portion is disposed at an end of the first sidewalls, the end being away from the end wall.

In the above technical solution, the sidewall includes two first sidewalls opposite to each other along the first direction. The first flange portion is disposed at an end of the first sidewalls, the end being away from the end wall. The first flange portion partially or fully protrudes beyond the inner surface of the first sidewalls, thereby reducing the space occupied by the first flange portion outside the box in the first direction, and in turn, increasing the dimension of the box in the first direction. In practical applications, the battery cell mounted in the accommodation space and the first flange portion can share a part of the space of the box in the first direction, thereby improving the energy density and grouping efficiency of the batteries that use the box.

According to some embodiments of this application, the box further includes a second flange portion. The second flange portion extends outward from an end of one of the second sidewalls, the end being away from the end wall.

In the above technical solution, the second flange portion extends outward from an end of the second sidewall, the end being away from the end wall. The second flange portion further increases the area of the flange face of the box, and improves the connection stability and force balance of the box. In addition, the second flange portion extends outward, thereby preventing the second flange portion from blocking the opening of the accommodation space, facilitating the mounting of the battery, facilitating efficient utilization of the internal space of the box, and increasing the energy density of the battery.

According to some embodiments of this application, the box further includes a third flange portion. The third flange portion is disposed at an end of the other second sidewall, the end being away from the end wall. The third flange portion at least partially protrudes beyond an inner surface of the other second sidewall.

In the above technical solution, the third flange portion is disposed at an end of the other second sidewall, the end being away from the end wall. The third flange portion partially or fully protrudes beyond the inner surface of the second sidewall, thereby reducing the space occupied by the third flange portion outside the box in the second direction, and in turn, increasing the dimension of the box in the second direction. In practical applications, the battery cell mounted in the accommodation space and the third flange portion can share a part of the space of the box in the second direction, thereby also improving the energy density and grouping efficiency of the batteries that use the box.

According to some embodiments of this application, a dimension of the end wall in the first direction is less than a dimension of the end wall in the second direction.

In the above technical solution, the first flange portion is located on two sides of the box in the width direction. The first flange portion partially or fully protrudes beyond the inner surface of the first sidewall, thereby reducing the dimension by which the first flange portion extends out of the box, or preventing the first flange portion from extending out of the box, and in turn, reducing the space occupied by the first flange portion outside the box in the width direction. Therefore, the space originally reserved for the first flange portion outside the box can be incorporated into the box to increase the overall accommodation space of the box. When a plurality of boxes are disposed in parallel along the width direction of the boxes, the above arrangement can further reduce waste of space of the plurality of boxes, and improve the energy density and grouping efficiency of batteries that use the box.

According to some embodiments of this application, a thickness of the sidewall is T, satisfying: $1\ \text{mm} \le T \le 6\ \text{mm}$.

In the above technical solution, the sidewall and the end wall jointly define an accommodation space with an opening. If the thickness of the sidewall is overly small, the structural strength of the box is relatively low, and the box is prone to deform under a force. If the thickness of the sidewall is overly large, the sidewall occupies a relatively large space, thereby being detrimental to the energy density and the grouping efficiency of the batteries. Designing the thickness of the sidewall to fall within the range of 1 mm to 6 mm can improve the structural strength of the box, and improve the energy density and grouping efficiency of the batteries that use the box.

According to some embodiments of this application, along a direction perpendicular to the end wall, a maximum height of the box is H1, satisfying: $50\ \text{mm} \le H1 \le 300\ \text{mm}$.

In the above technical solution, if the height of the box is overly small, the accommodation space of the box is not enough to accommodate the battery cell, or can accommodate just small-sized battery cells. This increases the difficulty of the manufacturing process of the batteries and is detrimental to the energy density of the battery that uses the box. On the other hand, an excessive height of the box is detrimental to the miniaturization and lightweight of the box, and may leave much redundant space in the box, thereby also being detrimental to the energy density of the battery that uses the box. Designing the height of the box to fall within the range of 50 mm to 300 mm is conducive to efficiently utilizing the space of the box and increasing the energy density of the battery that uses the box.

According to some embodiments of this application, a mounting portion configured to mount the box onto an electrical device is disposed on the end wall.

In the technical solution, a mounting portion is disposed on the end wall, thereby making it convenient to mount the box onto the electrical device through the mounting portion. In addition, the mounting portion is disposed on the end wall, thereby reducing the dimension by which the mounting portion extends out of the box, and in turn, reducing the space occupied by the mounting portion outside the box, and also increasing the energy density of the battery that uses the box.

According to some embodiments of this application, a flow channel configured to accommodate a heat exchange medium is disposed inside the end wall.

In the above technical solution, a flow channel that accommodates the heat exchange medium is disposed inside the end wall. In this way, the end wall can regulate the temperature of the battery cell accommodated in the accommodation space, thereby improving the controllability and equalization of temperature of the batteries. In addition, this design improves the functional integration degree of the box, simplifies the structure of the battery, and increases the energy density of the battery.

According to some embodiments of this application, a hoist hole configured to hoist the box is created on the sidewall.

In the above technical solution, a hoist hole is created on the sidewall to facilitate the hoist and transportation of the box. In addition, the hoist hole does not occupy additional space of the box in the length or width direction, thereby also increasing the energy density of the battery.

According to a second aspect, this application provides a box assembly, including: the box according to any one of the above technical solutions; and a cover, configured to cover the opening and be connected to the first flange portion.

In the above technical solution, the box assembly includes a box and a cover. The cover is connected to the first flange portion, so that the cover can seal the opening of the accommodation space and isolate the accommodation space from the external environment, thereby improving the hermeticity of the box.

According to some embodiments of this application, the cover includes: a body portion, configured to cover the opening and be connected to the first flange portion, where the body portion includes a first surface oriented toward the opening; and a flanged portion, extending from an edge of the body portion toward the end wall, where the flanged portion is configured to cover at least a part of an outer surface of the sidewall.

In the above technical solution, the cover includes a body portion covering the opening of the box and a flanged portion extending from the edge of the body portion. The flanged portion extends toward the end wall. The flanged portion can at least partially cover the outer surface of the sidewall of the box after the cover fits onto the opening of the box. The flanged portion serves to guide the fit between the box and the cover and assist in sealing the box.

According to some embodiments of this application, a groove is created on the outer surface of the sidewall. The flanged portion is at least partially accommodated in the groove.

In the above technical solution, a groove is created on the outer surface of the sidewall. The flanged portion is partially or fully accommodated in the groove. The groove can reduce the dimension by which the flanged portion protrudes beyond the outer surface of the sidewall, or prevent the flanged portion from protruding beyond the outer surface of the sidewall, thereby reducing the space occupied by the flanged portion separately outside the box, or preventing the flanged portion from occupying the space outside the box separately. The flanged portion and the sidewall share a part of the transverse space of the box, thereby further improving the energy density and grouping efficiency of the battery that uses the box.

According to some embodiments of this application, the sidewall includes two first sidewalls disposed opposite to each other along a first direction and two second sidewalls disposed opposite to each other along a second direction. The first direction is perpendicular to the second direction. The first flange portion is disposed at an end of the first sidewalls, the end being away from the end wall. The groove is created on the outer surface of the first sidewall.

In the above technical solution, the groove is created on the outer surface of the first sidewall, so that the first sidewall of the box and the flanged portion share a part of the space of the box along the first direction, thereby making it convenient for the battery cell to efficiently utilize the space of the box in the first direction, and improving the energy density and grouping efficiency of the batteries that use the box.

According to some embodiments of this application, along a direction perpendicular to the end wall, a maximum height of the cover is H2, satisfying: $H2 \leq 10$ mm.

In the above technical solution, the larger the height of the cover, the more space the cover occupies, and the more space is wasted by the battery that uses the box. Designing the maximum height of the cover to fall within 10 mm can reduce the waste of space of the box caused by the cover, thereby improving the energy density and grouping efficiency of the batteries that use the box.

According to some embodiments of this application, the cover is riveted or screwed to the first flange portion.

In the above technical solution, the cover is riveted or screwed to the first flange portion, thereby facilitating disassembling and assembling, achieving high stability of connection, and facilitating grouping of the box assembly.

According to some embodiments of this application, the box assembly further includes a sealing element. At least a part of the sealing element is disposed between the cover and the first flange portion.

In the above technical solution, a sealing element is disposed between the cover and the first flange portion of the box to implement hermetic connection between the cover and the box, thereby improving the sealing performance of the grouped batteries.

According to a third aspect, this application provides a battery, including: the box assembly according to any one of the above technical solutions; and a plurality of battery cells, disposed in the accommodation space.

According to some embodiments of this application, the plurality of battery cells form a battery module. At least three battery modules are disposed in parallel along a direction parallel to the end wall.

In the above technical solution, at least three battery modules are arranged in parallel along a direction parallel to the end wall in the accommodation space. In this way, the dimension of the opening of the accommodation space is much larger than the dimension of the battery modules. The battery modules can avoid the box mutually when being mounted into the box, thereby reducing the possibility of the first flange portion interfering with the mounting of the battery modules, facilitating efficient utilization of the accommodation space of the box, reducing the waste of space within the box, and also improving the energy density and grouping efficiency of the batteries that use the box.

According to some embodiments of this application, viewed along a direction perpendicular to the end wall, the first flange portion overlaps at least a part of the plurality of battery cells to form an overlap region.

In the above technical solution, the first flange portion and the battery cell share a space in the box in a direction parallel to the end wall, thereby increasing the rate of occupancy of the accommodation space of the box by the battery cells, reducing the waste of space below the first flange portion in the accommodation space, and improving the energy density and grouping efficiency of the batteries that use the box.

According to a fourth aspect, this application provides an electrical device. The electrical device includes the battery disclosed in any one of the foregoing technical solutions. The battery is configured to provide electrical energy.

BRIEF DESCRIPTION OF DRAWINGS

To describe technical solutions in embodiments of this application more clearly, the following outlines the drawings to be used in the embodiments. Understandably, the following drawings show merely some embodiments of this application, and therefore, are not intended to limit the scope. A person of ordinary skill in the art may derive other related drawings from the drawings without making any creative efforts.

Figure 1:
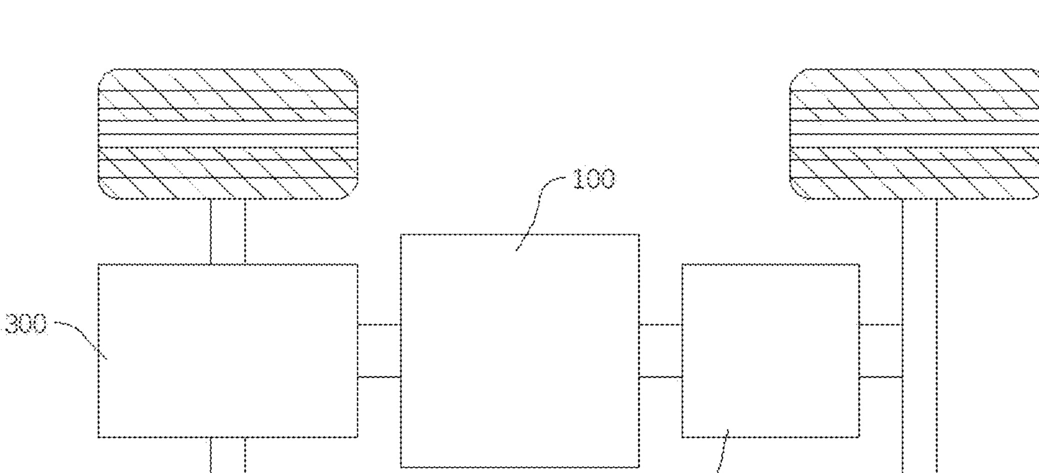
FIG. 1 is a schematic structural diagram of a vehicle according to some embodiments of this application.

The drawings are not drawn to scale.

LIST OF REFERENCE NUMERALS

1000—vehicle; 100—battery; 10—battery module; 11—battery cell; 20—box assembly; 21—box; 211—end wall; 2111—flow channel; 212—sidewall; 2121—first sidewall; 2122—second sidewall; 2123—groove; 213—accommodation space; 214—first flange portion; 2141—first sub-portion; 2142—second sub-portion; 2143—first flange face; 215—threaded hole; 216—second flange portion; 2161—second flange face; 217—third flange portion; 2171—third flange face; 218—hoist hole; 219—mounting portion; 22—cover; 221—body portion; 222—flanged portion; 223—first surface; 23—sealing element; 200—controller; 300—motor; X—first direction; Y—second direction; Z—third direction.

DETAILED DESCRIPTION OF EMBODIMENTS

To make the objectives, technical solutions, and advantages of some embodiments of this application clearer, the following gives a clear and complete description of the technical solutions in some embodiments of this application with reference to the drawings in some embodiments of this application. Apparently, the described embodiments are merely a part of but not all of the embodiments of this application. All other embodiments derived by a person of ordinary skill in the art based on the embodiments of this application without making any creative efforts shall fall within the protection scope of this application.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that an embodiment described in this application may be combined with another embodiment.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

In embodiments of this application, the same reference numeral denotes the same component. For brevity, detailed descriptions of the same component are omitted in a different embodiment. Understandably, dimensions such as thickness, length, and width of various components in some embodiments of this application shown in the drawings, and dimensions such as overall thickness, length, and width of an integrated device are merely illustrative descriptions, but do not constitute any limitation on this application.

"A plurality of" referred to in this application means two or more (including two).

In this application, a battery cell may include a lithium-ion secondary battery, a lithium-ion primary battery, a lithium-sulfur battery, a sodium-ion battery, a magnesium-ion battery, or the like, without being limited herein. The battery cell may be in a shape such as a flat body, a cuboid, or the like, or may be a pouch cell, without being limited herein.

The battery mentioned in embodiments of this application means a unitary physical module that includes one or more battery cells to provide a higher voltage and a higher capacity. For example, the battery mentioned in this application may include a battery module, a battery pack, or the like.

A battery cell includes an electrode assembly and an electrolyte solution. The electrode assembly includes a positive electrode plate, a negative electrode plate, and a separator. The battery cell works primarily by shuttling metal ions between the positive electrode plate and the negative electrode plate. The electrode assembly may be of a jelly-roll structure or a stacked structure, without being limited herein.

Batteries exhibit outstanding advantages such as a high energy density, low environmental pollution, a high power density, a long service life, a wide range of adaptability, and a small self-discharge coefficient, and are an important part of new energy development nowadays. How to increase the energy density of a battery is a pressing technical challenge.

In some technologies, the battery further includes a box configured to package one or more battery cells or a plurality of battery modules. The box prevents liquid or other foreign matters from affecting the charging or discharging of the battery cells. The box may include a first part and a second part. The first part and the second part fit and cover each other. The first part and the second part jointly define an assembling space configured to accommodate the battery cell. To facilitate connection, a flange portion is typically disposed in the first part. The flange portion is connected to the second part to form a connecting region.

The applicant finds that, in some technologies, the flange portion protrudes beyond the outer surface of the box. The flange portion needs to separately occupy a part of the space outside the box of the battery, thereby resulting in a considerable waste of space, and impairing the energy density and grouping efficiency of the batteries.

For the above reasons, in order to improve the energy density and grouping efficiency of the battery, the applicant has designed a box through research. The box includes: an end wall and a sidewall that encloses the end wall peripherally. A first flange portion is disposed at an end of the sidewall, the end being away from the end wall. The first flange portion at least partially protrudes beyond an inner surface of the sidewall.

In the technical solution of this application, the first flange portion of the sidewall of the box provides a connecting face for the box. The first flange portion partially or fully protrudes beyond the inner surface of the sidewall of the box, so that the first flange portion can share a part of space with an object (such as a battery cell) contained in the accommodation space, thereby reducing the dimension by which the first flange portion extends out of the box, or preventing the first flange portion from extending out of the box. This reduces the space occupied by the first flange portion outside the box or prevents the first flange portion from occupying the space outside the box. Therefore, the space originally reserved for the first flange portion outside the box can be incorporated into the box to increase the overall accommodation space of the box, reduce space waste, and improve the energy density and grouping efficiency of batteries that use the box.

The battery disclosed in some embodiments of this application is applicable to, but not limited to, electrical devices such as a vehicle, watercraft, or aircraft. A power supply system of the electrical devices may be formed of the battery disclosed herein.

An embodiment of this application provides an electrical device powered by a battery. The electrical device may be, but is not limited to, a mobile phone, a tablet, a laptop computer, an electric toy, an electric tool, an electric power cart, an electric vehicle, a ship, a spacecraft, or the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

The battery described in an embodiment of this application is not only applicable to the electrical devices described above, but also applicable to all electrical devices that use a battery. For brevity, however, the following embodiments are described by using an electric vehicle as an example of the electrical devices.

Referring to FIG. 1, FIG. 1 is a schematic structural diagram of a vehicle 1000 according to some embodiments of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000. The vehicle 1000 may further include a controller 200 and a motor 300. The controller 200 is configured to control the battery 100 to supply power to the motor 300, for example, to meet electrical energy requirements in starting, navigating, or running the vehicle 1000.

In some embodiments of this application, the battery 100 serves not only as an operating power supply of the vehicle 1000, but may also serve as a driving power supply of the vehicle 1000 to provide driving power for the vehicle 1000 in place of or partly in place of fuel oil or natural gas.

Figure 2:
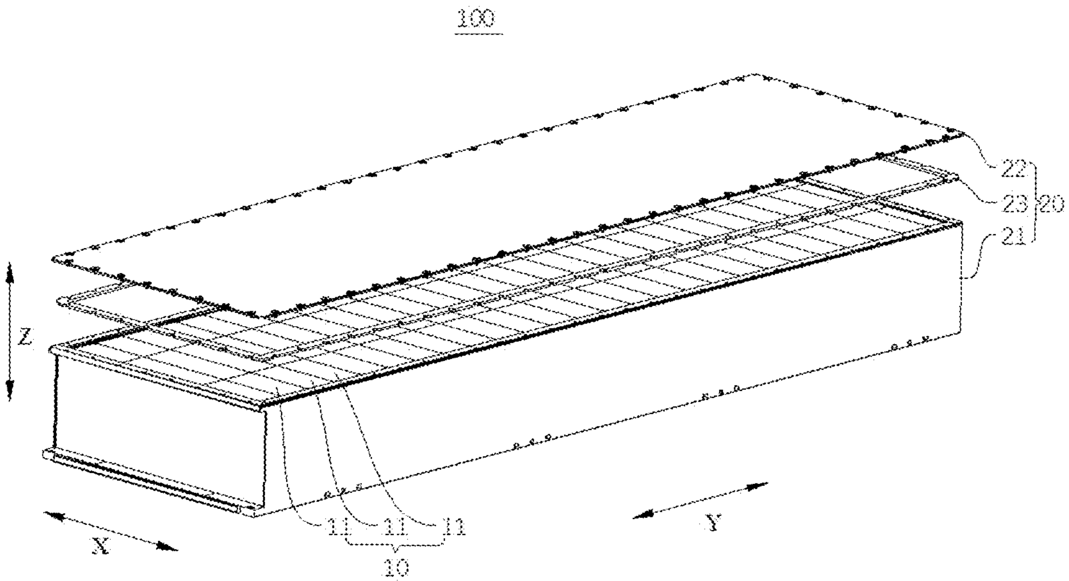
FIG. 2 is a schematic structural diagram of a battery according to some embodiments of this application.

Referring to FIG. 2, FIG. 2 is a schematic structural diagram of a battery 100 according to some embodiments of this application. The battery 100 may include a box assembly 20 and a battery cell 11. The battery cell 11 is accommodated in the box assembly 20. The battery 100 may contain a plurality of battery cells 11. The plurality of battery cells 11 may be connected in series, parallel, or series-and-parallel pattern. The series-and-parallel pattern means a combination of series connection and parallel connection of the plurality of battery cells 11. The plurality of battery cells 11 may be directly connected in series, parallel, or series-and-parallel pattern, and then the whole of the plurality of battery cells 11 may be accommodated in the box assembly 20. Alternatively, to make up a battery 100, the plurality of battery cells 11 may be connected in series, parallel, or series-and-parallel pattern to form a battery module 10 first, and then a plurality of battery modules 10 are connected in series, parallel, or series-and-parallel pattern to form a whole and accommodated in the box assembly 20. The battery 100 may further include other structures. For example, the battery 100 may further include a busbar component. The busbar component is configured to implement electrical connection between the plurality of battery cells 11.

Each battery cell 11 may be, but is not limited to, a secondary battery or primary battery; or, may be a lithium-sulfur battery, a sodium-ion battery, or a magnesium-ion battery. The battery cell 11 may be in a shape such as a cylinder, a flat body, a cuboid, or other shapes. As an example, the battery cell 11 is in a cuboidal shape.

The box assembly 20 is configured to provide an assembling space for the battery cell 11. The box assembly 20 may assume various structures. In some embodiments, the box assembly 20 may include a box 21 and a cover 22. The box 21 and the cover 22 fit each other. The box 21 and the cover 22 jointly define an assembling space configured to accommodate the battery cell 11. The box 21 may be a hollow structure opened at one end. The cover 22 may be a plate-like structure. The cover 22 fits the opening of the box 21 so that the box 21 and the cover 22 jointly define the assembling space. Alternatively, both the box 21 and the cover 22 may be hollow structures opened at one side, and the opening of the box 21 fits the opening of the cover 22. Definitely, the box assembly 20 formed by the box 21 and the cover 22 may be in various shapes, such as a cylinder or a cuboid.

Figure 3:
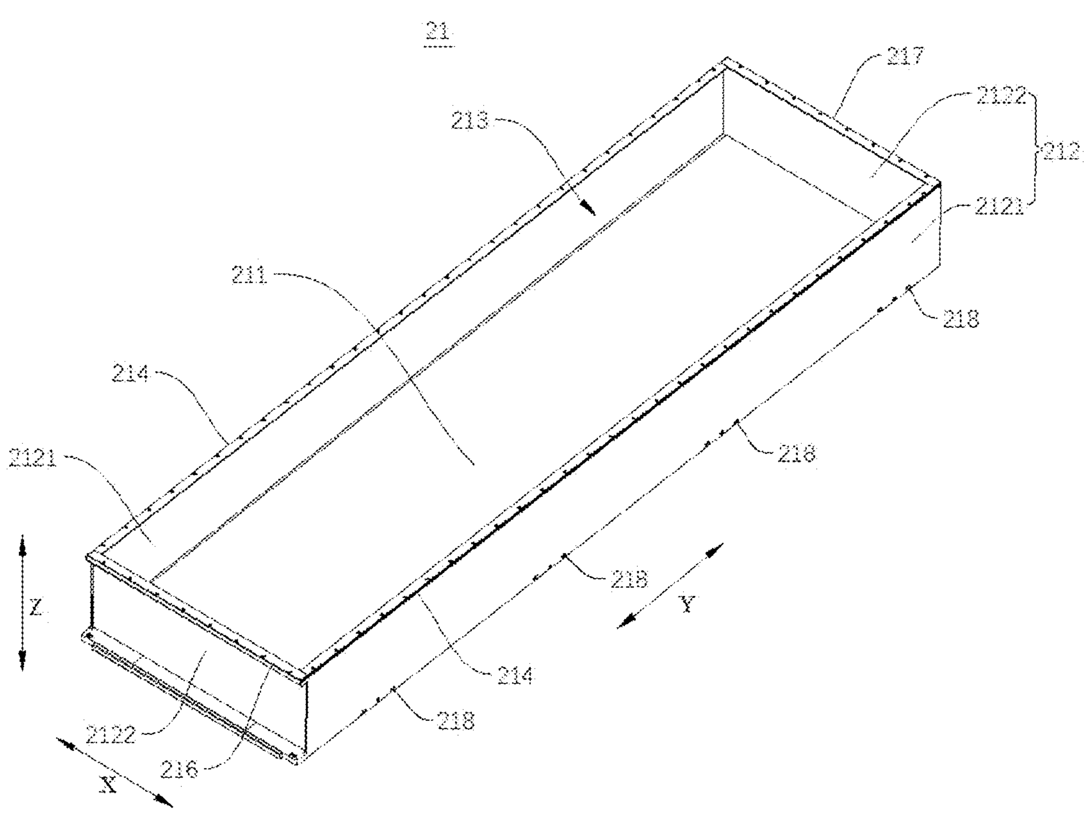
FIG. 3 is an axonometric projection drawing of a box according to some embodiments of this application.
Figure 4:
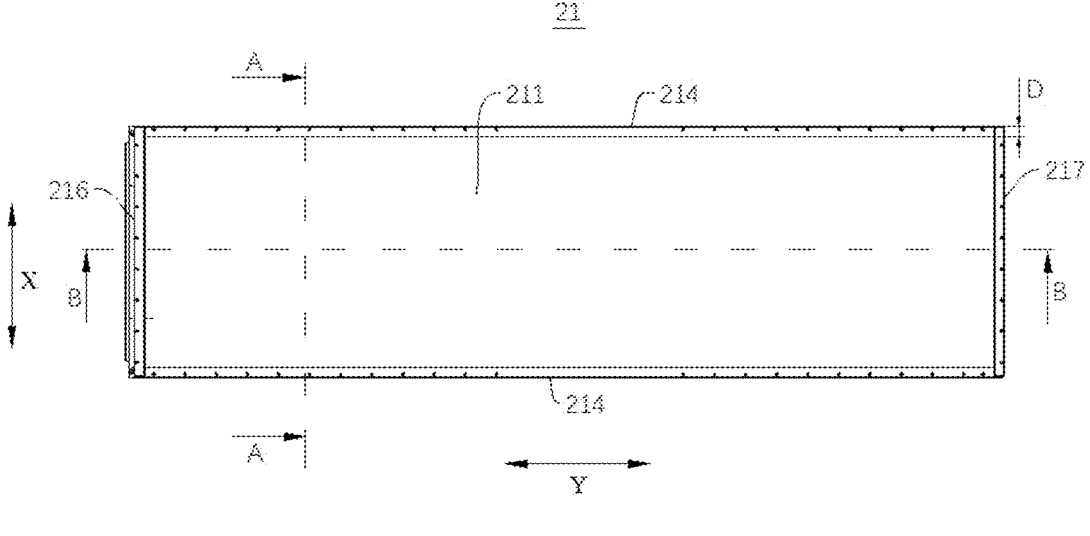
FIG. 4 is a top view of a box according to some embodiments of this application.
Figure 5:
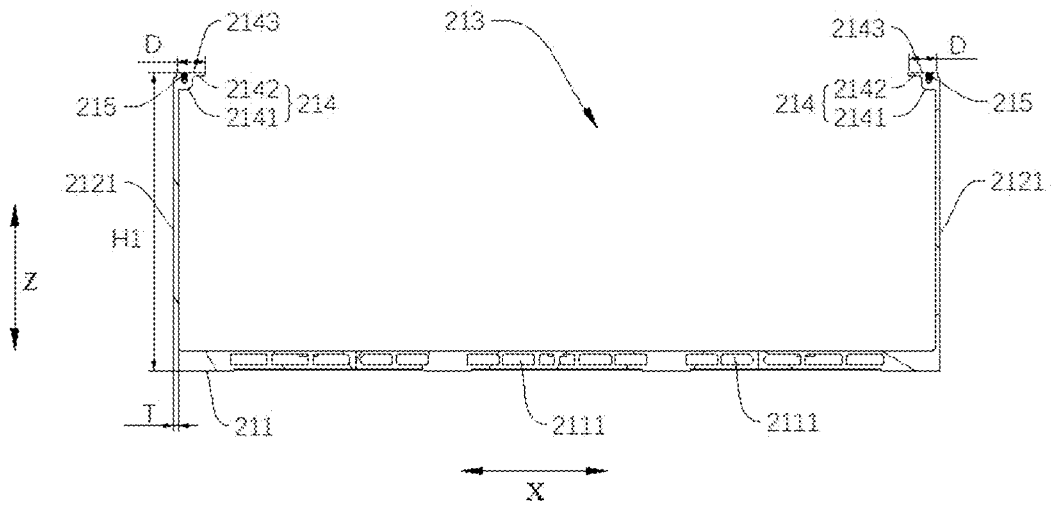
FIG. 5 is a cross-sectional view of the box shown in FIG. 4 and sectioned along an A-A direction according to some embodiments.
Figure 6:
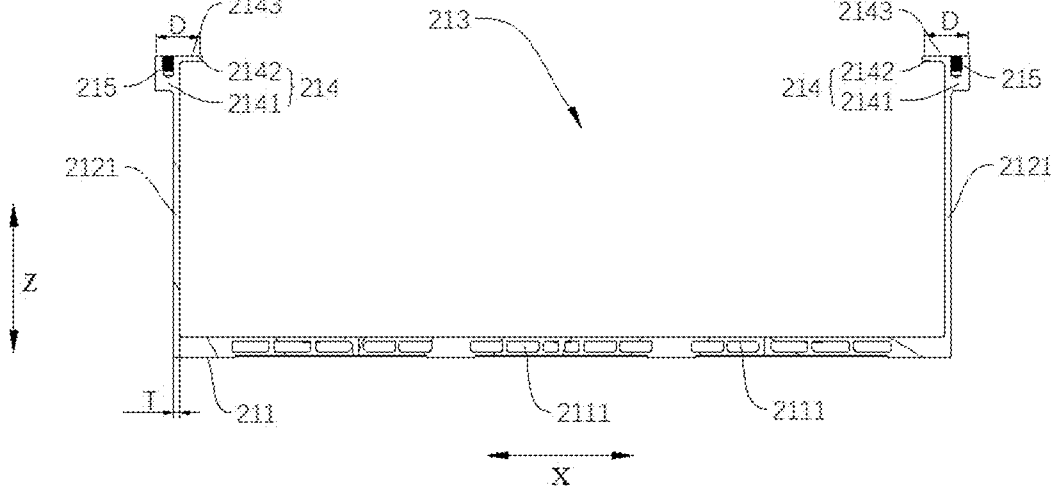
FIG. 6 is a cross-sectional view of the box shown in FIG. 4 and sectioned along an A-A direction according to some other embodiments.

Referring to FIG. 3 to FIG. 6, FIG. 3 is an axonometric projection drawing of a box according to some embodiments of this application; FIG. 4 is a top view of a box according to some embodiments of this application; FIG. 5 is a cross-sectional view of the box provided in some embodiments and sectioned along an A-A direction according to some embodiments of this application; and FIG. 6 is a cross-sectional view of the box provided in some embodiments and sectioned along an A-A direction according to some other embodiments of this application. Some embodiments of this application provide a box 21. The box 21 includes an end wall 211, a sidewall 212, and a first flange portion 214. The sidewall 212 encloses the end wall 211 peripherally. The sidewall 212 and the end wall 211 jointly define an accommodation space 213 with an opening. The first flange portion 214 is disposed at an end of the sidewall 212, the end being away from the end wall 211. The first flange portion 214 at least partially protrudes beyond an inner surface of the sidewall 212.

Specifically, the sidewall 212 and the end wall 211 close in to form a hollow structure opened at one end. The end wall 211 is opposite to the opening along a thickness direction (the Z-direction shown in FIG. 3) of the end wall 211. In practical applications, the battery cell 11 can fit into the accommodation space 213 of the box 21. The end wall 211 may be located at the bottom of the battery cell 11 as a bottom wall of the box 21 to support the battery cell 11. Alternatively, the end wall 211 may be located above the battery cell 11 as a top wall of the box 21. In some other embodiments, the end wall 211 may be located on a lateral side of the battery cell 11. As an example, the end wall 211 forms a bottom wall of the box 21, and the end wall 211 may be configured to support the battery cell 11.

The first flange portion 214 is disposed at an end of the sidewall 212, the end being away from the end wall 211. In other words, the first flange portion 214 is close to the opening of the accommodation space 213. The first flange portion 214 is configured to connect the box 21 to the cover 22 or another mounting face. After being connected, a surface of the first flange portion 214, which is oriented toward or in direct contact with the cover 22 or another mounting face, forms a connecting face of the first flange portion 214 (that is, the first flange face 2143 to be mentioned below).

Understandably, that the first flange portion 214 is disposed at an end of the sidewall 212, the end being away from the end wall 211, may mean that the first flange portion 214 extends from an end portion of the sidewall 212, the end portion being oriented away from the end wall 211; or, may mean that the first flange portion 214 is just close to an end portion of the sidewall 212, the end portion being oriented away from the end wall 211, that is, a small distance exists between the first flange portion 214 and an end portion of the sidewall 212, the end portion being oriented away from the end wall 211.

In some embodiments, as shown in FIG. 5, the first flange portion 214 may all protrude beyond the inner surface of the sidewall 212. In other words, the first flange portion 214 is formed on the inner surface of the sidewall 212 and protrudes beyond the inner surface of the sidewall 212.

Alternatively, in some other embodiments, as shown in FIG. 6, the first flange portion 214 may partially protrude beyond the inner surface of the sidewall 212. For example, the first flange portion 214 may be formed at an end portion of the sidewall 212, and the first flange portion 214 may include a first part and a second part, the first part protruding beyond the outer surface of the sidewall 212, and the second part protruding beyond the inner surface of the sidewall 212. After the first flange portion 214 is connected to the cover 22 or another mounting face, a part of the surface of the first part and a part of the surface of the second part jointly form a connecting face of the first flange portion 214 (that is, the first flange face 2143 to be mentioned below).

The first flange portion 214 may be formed in one piece together with the sidewall 212 of the box 21, or may be disposed separately from the sidewall 212 of the box 21, and may be connected to the sidewall of the box to form an integral structure by welding, bonding, riveting, screwing, or other means.

In some embodiments, the first flange portion 214 and the sidewall 212 are formed in one piece. The one-piece structure increases the structural strength of the first flange portion 214 and the overall box 21, and in turn, improves the structural stability of the box 21.

As an example, as shown in FIG. 5, the first flange portion 214 extend tortuously into the accommodation space 213 from an end portion of the sidewall 212, the end portion being oriented away from the end wall 211. The first flange portion 214 and the sidewall 212 are formed in one piece.

The material of the first flange portion 214 may be the same as the material of the sidewall 212, or may be different from the material of the sidewall 212. For example, the end wall 211 and the sidewall 212 of the box 21 may be made of metal such as aluminum or alloy, and the first flange portion 214 may be made of the same material as the sidewall 212, and also made of metal such as aluminum or alloy, without being particularly limited herein.

The first flange portion 214 of the sidewall 212 of the box 21 provides a connecting face for the box 21. The first flange portion 214 partially or fully protrudes beyond the inner surface of the sidewall 212 of the box 21, so that the first flange portion 214 can share a part of the accommodation space 213, thereby reducing the dimension by which the first flange portion 214 extends out of the box 21, or preventing the first flange portion 214 from extending out of the box 21. This reduces the space occupied by the first flange portion 214 outside the box 21 or prevents the first flange portion 214 from occupying the space outside the box 21. Therefore, the space originally reserved for the first flange portion 214 outside the box 21 can be incorporated into the box 21 to increase the overall accommodation space 213 of the box 21, reduce space waste, and improve the energy density and grouping efficiency of batteries 100 that use the box 21.

In some embodiments, a threaded hole 215 is created on the first flange portion 214.

As mentioned earlier, the first flange portion 214 is configured to connect the box 21 to the cover 22 or another mounting face. The threaded hole 215 created on the first flange portion 214 is configured to connect the box 21 to the cover 22 or another mounting face. Specifically, a bolt, stud, or another fastener may be passed in the threaded hole 215 to get threadedly connected to the box 21, thereby connecting the box to the cover 22 or another mounting face.

The axial direction of the threaded hole 215 may extend along a direction roughly parallel to the sidewall 212. The threaded hole 215 may run through the first flange portion 214 or may not run through the first flange portion 214. In some embodiments, the threaded hole 215 does not run through the first flange portion 214. That is, the threaded hole 215 forms a blind hole structure on the first flange portion 214.

A threaded hole 215 is created on the first flange portion 214. Through the threaded hole 215, it is convenient to connect the box 21 to other accessories or fix the box 21 to a carrier, thereby improving convenience of mounting the box 21.

In some embodiments, referring to FIG. 4 to FIG. 6, the first flange portion 214 includes a first flange face 2143 oriented away from the end wall 211. A width of the first flange face 2143 is D, satisfying: 10 mm≤D≤30 mm.

As mentioned earlier, the first flange portion 214 is configured to connect the box 21 to the cover 22 or another mounting face. After being connected, a surface of the first flange portion 214, which is oriented toward or in direct contact with the cover 22 or another mounting face, forms a connecting face of the first flange portion 214. The connecting face is the first flange face 2143 of the first flange portion 214.

Understandably, the plane in which the first flange face 2143 is located intersects the sidewall 212. The first flange face 2143 may be perpendicular to the sidewall 212, or may not be perpendicular to the sidewall 212. As an example, the first flange face 2143 is perpendicular to the sidewall 212.

The width of the first flange face 2143 means a distance from one end to the other end of the first flange face 2143 along a direction perpendicular to a line connecting the first flange face 2143 and the sidewall 212 and parallel to the first flange face 2143 (as shown in FIG. 5, the sidewall is parallel to the Z-direction, the first flange face 2143 is perpendicular to the sidewall 212, and the width direction of the first flange face 2143 extends along the X-direction shown in FIG. 5).

The width D of the first flange face 2143 may be a value greater than or equal to 10 mm and less than or equal to 30 mm, for example, 10 mm, 11 mm, 12 mm, 13 mm, 15 mm, 20 mm, 25 mm, or 30 mm.

In some embodiments, the width D of the first flange face 2143 may be a value greater than or equal to 15 mm and less than or equal to 25 mm, for example, 15 mm, 16 mm, 17.5 mm, 18 mm, 19 mm, 20 mm, 21 mm, 22 mm, 23 mm, or 24 mm.

As an example, the width D of the first flange face 2143 may be 15 mm.

The first flange face 2143 configured to connect the box is formed on the first flange portion 214 on a side oriented away from the end wall 211. If the width of the first flange face 2143 is overly small, the width of a connecting region available from the first flange portion 214 is overly small, thereby being unfavorable to improving the reliability of connecting or sealing the box 21. On the other hand, if the width of the first flange face 2143 is overly large, the width of the first flange portion 214 is overly large, and the height by which the first flange portion 214 protrudes beyond the inner surface of the sidewall 212 is relatively large accordingly, thereby being prone to excessively block the opening of the accommodation space 213 and cause inconvenience to mounting the battery cell 11 into the box 21. Designing the width D of the first flange face 2143 to fall within the range of 10 mm to 30 mm can improve the connection reliability of the first flange face 2143 while preventing the first flange portion 214 from excessively blocking the opening of the accommodation space 213, thereby efficiently utilizing the space inside the box 21 and increasing the energy density of the battery 100 that uses the box 21.

In some embodiments, the first flange portion 214 includes a first flange face 2143 oriented away from the end wall 211. The first flange portion 214 includes a first sub-portion 2141 and a second sub-portion 2142. The first sub-portion 2141 is connected to the second sub-portion 2142 and the sidewall 212. Along a direction perpendicular to the first flange face 2143, a thickness of the first sub-portion 2141 is greater than a thickness of the second sub-portion 2142.

Specifically, as shown in FIG. 5 and FIG. 6, the first flange portion 214 includes a first sub-portion 2141 and a second sub-portion 2142. The first sub-portion 2141 includes a first sub-flange face oriented away from the end wall 211. The second sub-portion 2142 includes a second sub-flange oriented away from the end wall 211. The first sub-flange face and the second sub-flange face together form a first flange face 2143.

The first sub-portion 2141 is connected to the second sub-portion 2142 and the sidewall 212. To be specific, of the first sub-portion 2141, one part is connected to the sidewall 212, and another part is connected to the second sub-portion 2142. The second sub-portion 2142 and the sidewall 212 are connected by the first sub-portion 2141.

The first sub-portion 2141 may protrude beyond the outer surface of the sidewall 212, or may protrude beyond the inner surface of the sidewall 212. The second sub-portion 2142 may protrude beyond the inner surface of the sidewall 212.

In some embodiments, as shown in FIG. 5, both the first sub-portion 2141 and the second sub-portion 2142 protrude beyond the inner surface of the sidewall 212.

In some other embodiments, as shown in FIG. 6, the first sub-portion 2141 protrudes beyond the outer surface of the sidewall 212, and the second sub-portion 2142 protrudes beyond the inner surface of the sidewall 212.

As shown in FIG. 5 and FIG. 6, the first flange face 2143 extends in a plane parallel to the X-direction. The Z-direction is perpendicular to the first flange face 2143. Along the Z-direction, the thickness of the first sub-portion 2141 is greater than the thickness of the second sub-portion 2142.

As an example, as shown in FIG. 5 and FIG. 6, the first flange face 2143 is perpendicular to the thickness direction of the end wall 211. Along the thickness direction of the end wall 211, the thickness of the first sub-portion 2141 is greater than the thickness of the second sub-portion 2142.

The first flange portion 214 includes a second sub-portion 2142 and a first sub-portion 2141 thicker than the second sub-portion 2142. The first sub-portion 2141 is connected to the sidewall 212 and the second sub-portion 2142. The first sub-portion 2141 reinforces the structure by increasing the thickness of the structure, thereby further increasing the structural strength of the first flange portion 214.

In some embodiments, as shown in FIG. 5 and FIG. 6, a threaded hole 215 is created on the first sub-portion 2141.

As mentioned earlier, the threaded hole 215 created on the first flange portion 214 is configured to connect the box 21 to the cover 22 or another mounting face. The axial direction of the threaded hole 215 may extend along a direction roughly perpendicular to the first flange face 2143. The threaded hole 215 may run through the first sub-portion 2141 or may not run through the first sub-portion 2141. In some embodiments, the threaded hole 215 does not run through the first sub-portion 2141. That is, the threaded hole 215 forms a blind hole structure on the first sub-portion 2141.

The thickness of the first sub-portion 2141 is greater than the thickness of the second sub-portion 2142. The threaded hole 215 is created on the first sub-portion 2141, thereby increasing the processing depth of the threaded hole 215, and improving the connection stability of the box 21 and the structural stability of the box subjected to force. Moreover, the threaded hole 215 is created on the relatively thick first sub-portion 2141 of the first flange portion 214, thereby reducing the impact caused by the threaded hole 215 on the structural strength of the first flange portion 214, and improving the structural strength and structural stability of the box 21.

In some embodiments, still referring to FIG. 3 and FIG. 4, the sidewall 212 includes two first sidewalls 2121 disposed opposite to each other along a first direction X and two second sidewalls 2122 disposed opposite to each other along a second direction Y. The first direction X is perpendicular to the second direction Y. The first flange portion 214 is disposed at an end of the first sidewalls 2121, the end being away from the end wall 211.

To be specific, the two first sidewalls 2121, the two second sidewalls 2122, and the end wall 211 close in together to form a hollow structure opened at one end. The two first sidewalls 2121 are disposed opposite to each other along a first direction X. The two second sidewalls 2122 are disposed opposite to each other along a second direction Y. The thickness direction of the end wall 211 extends along a third direction Z. The first direction X, the second direction Y, and the third direction Z are perpendicular to each other. The entire box 21 forms a hexahedral structure opened on one side.

The first flange portion 214 is disposed at an end of the first sidewall 2121, the end being away from the end wall 211. In other words, the first flange portion 214 is disposed at one end of each of the two first sidewalls 2121, the end being away from the end wall 211. The two first flange portions 214 are disposed on two opposite sides of the box 21 along the first direction X.

Each first flange portion 214 at least partially protrudes beyond the inner surface of the first sidewall 2121 connected to the first flange portion 214. In other words, the two first flange portions 214 may at least partially extend toward each other into the accommodation space 213.

The first flange portion 214 partially or fully protrudes beyond the inner surface of the first sidewalls 2121, thereby reducing the space occupied by the first flange portion 214 outside the box 21 in the first direction X, and in turn, increasing the dimension of the box 21 in the first direction X. In practical applications, the battery cell 11 mounted in the accommodation space 213 and the first flange portion 214 can share a part of the space of the box 21 in the first direction X, thereby improving the energy density and grouping efficiency of the batteries 100 that use the box 21.

Figure 7:
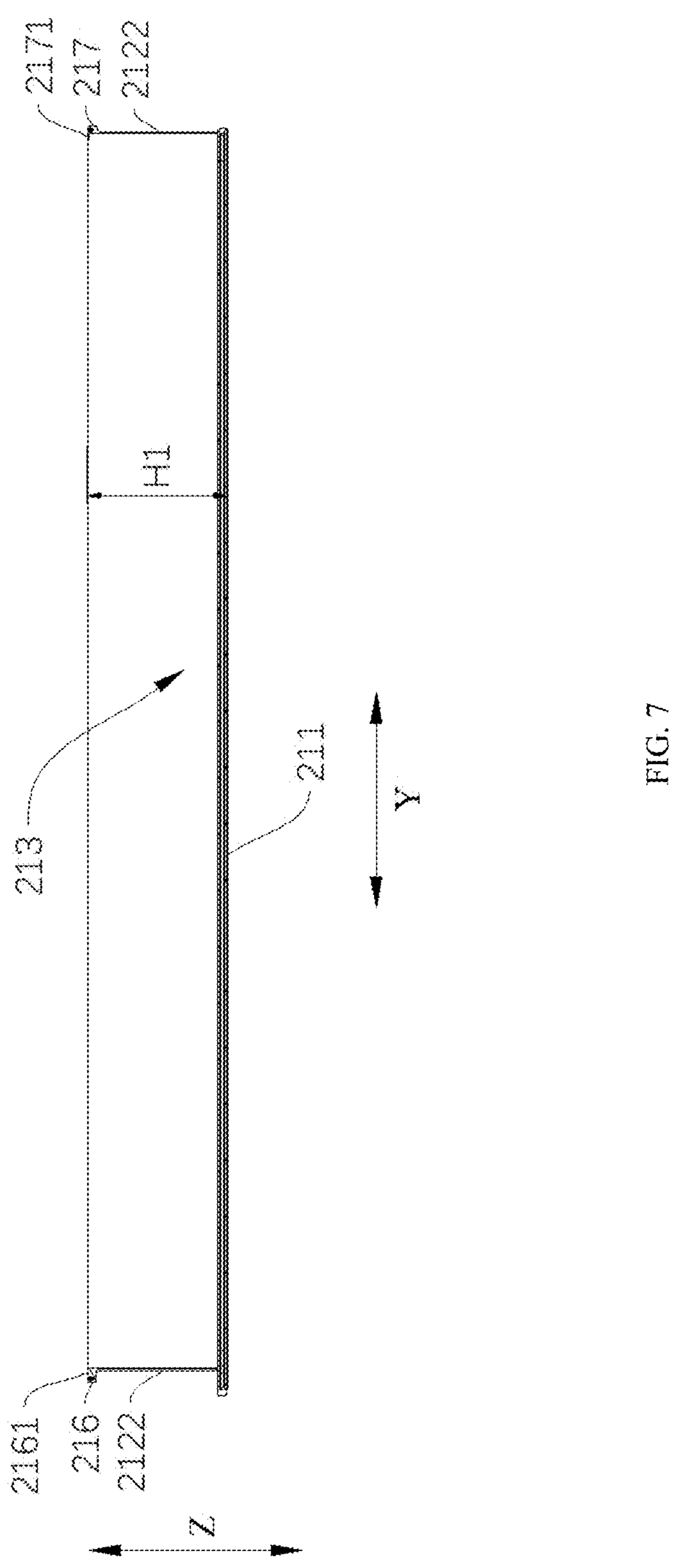
FIG. 7 is a cross-sectional view of the box shown in FIG. 4 and sectioned along a B-B direction.

In some embodiments, referring to FIG. 3 and FIG. 4 together with FIG. 7, FIG. 7 is a cross-sectional view of a box provided in some embodiments of this application and sectioned along a B-B direction. The box 21 further includes a second flange portion 216. The second flange portion 216 extends outward from an end of one of the second sidewalls 2122, the end being away from the end wall 211.

Understandably, based on the same functional principles as the first flange portion 214, the second flange portion 216 is configured to work together with the first flange portion 214 to jointly connect the box 21 to the cover 22 or another mounting face. Specifically, the second flange portion 216 includes a second flange face 2161 oriented away from the end wall 211. Both the second flange face 2161 and the first flange face 2143 are configured to be connected to the cover 22 or another mounting face. As an example, the first flange face 2143 and the second flange face 2161 are coplanar.

The end portion of the second flange portion 216 along the first direction X may be connected to the first flange portion 214, or may be disconnected from the first flange portion 214. As an example, the two ends of the second flange portion 216 along the first direction X are respectively connected to the two first flange portions 214 disposed opposite to each other along the first direction X.

The second flange portion 216 is disposed at an end of the second sidewall 2122, the end being away from the end wall 211. The second flange portion 216 extends from the second sidewall 2122 away from the accommodation space 213. In other words, the second flange portion 216 partially or fully protrudes beyond the outer surface of the second sidewall 2122.

The second flange portion 216 further increases the area of the flange face of the box 21, and improves the connection stability and force balance of the box 21. In addition, the second flange portion 216 extends outward, thereby preventing the second flange portion 216 from blocking the opening of the accommodation space 213, facilitating the mounting of the battery 100, facilitating efficient utilization of the internal space of the box 21, and increasing the energy density of the battery 100.

In some embodiments, still referring to FIG. 3, FIG. 4, and FIG. 7, the box 21 further includes a third flange portion 217. The third flange portion 217 is disposed at an end of the other second sidewall 2122, the end being away from the end wall 211. The third flange portion 217 at least partially protrudes beyond an inner surface of the other second sidewall 2122.

Based on the same functional principles as the first flange portion 214 and the second flange portion 216, the third flange portion 217 is configured to work together with the first flange portion 214 and the second flange portion 216 to jointly connect the box 21 to the cover 22 or another mounting face. Specifically, the third flange portion 217 includes a third flange face 2171 oriented away from the end wall 211. The third flange face 2171, the first flange face 2143, and the second flange face 2161 are all configured to be connected to the cover 22 or another mounting face. As an example, the first flange face 2143, the second flange face 2161, and the third flange face 2171 are coplanar.

Similar to the structure of the second flange portion 216, the end portion of the third flange portion 217 along the first direction X may be connected to the first flange portion 214, or may be disconnected from the first flange portion 214. As an example, the two ends of the third flange portion 217 along the first direction X are respectively connected to the two first flange portions 214 disposed opposite to each other along the first direction X.

The third flange portion 217 is disposed at an end of the second sidewall 2122, the end being away from the end wall 211. In addition, the third flange portion 217 partially or fully protrudes beyond the inner surface of the second sidewall 2122 connected to the third flange portion 217.

The third flange portion 217 partially or fully protrudes beyond the inner surface of the second sidewalls 2122, thereby reducing the space occupied by the third flange portion 217 outside the box 21 in the second direction Y, and in turn, increasing the dimension of the box 21 in the second direction Y. In practical applications, the battery cell 11 mounted in the accommodation space 213 and the third flange portion 217 can share a part of the space of the box 21 in the second direction Y, thereby improving the energy density and grouping efficiency of the batteries 100 that use the box 21.

In some embodiments, as shown in FIG. 3, a dimension of the end wall 211 in the first direction X is less than a dimension of the end wall in the second direction Y.

That the dimension of the end wall 211 in the first direction X is less than the dimension of the end wall in the second direction Y means: the width direction of the end wall 211 extends along the first direction X, and the length direction of the end wall 211 extends along the second direction Y. The box 21 assumes a hexahedral structure opened at one end. If the thickness direction (third direction Z) of the end wall 211 is used as the height direction of the box 21, then the width direction of the box 21 extends along the first direction X, and the length direction of the box 21 extends along the second direction Y.

The first flange portion 214 is located on two sides of the box 21 in the width direction. The first flange portion 214 partially or fully protrudes beyond the inner surface of the first sidewall 2121, thereby reducing the dimension by which the first flange portion 214 extends out of the box 21, or preventing the first flange portion 214 from extending out of the box 21, and in turn, reducing the space occupied by the first flange portion 214 outside the box 21 in the width direction. Therefore, the space originally reserved for the first flange portion 214 outside the box 21 can be incorporated into the box 21 to increase the overall accommodation space 213 of the box 21. When a plurality of boxes 21 are disposed in parallel along the width direction of the boxes 21, the above arrangement can further reduce waste of space of the plurality of box 21 assemblies, and improve the energy density and grouping efficiency of batteries 100 that use the box 21.

In some embodiments, as shown in FIG. 5 and FIG. 6, the thickness of the sidewall 212 is T, satisfying: 1 mm≤T≤6 mm.

Specifically, the sidewall 212 may be an equal-thickness structure. The thickness of the sidewall 212 may be any value greater than 1 mm and less than 6 mm. For example, the thickness T of the sidewall 212 may be 1 mm, 2 mm, 3 mm, 4 mm, 5 mm, 6 mm, or the like.

Alternatively, the sidewall 212 may be an unequal-thickness structure. The maximum thickness of the sidewall 212 may be less than or equal to 6 mm, and the minimum thickness of the sidewall 212 may be greater than or equal to 1 mm.

As an example, the sidewall 212 is an equal-thickness structure, and the thickness T of the sidewall 212 is 3 mm.

The sidewall 212 and the end wall 211 jointly define an accommodation space 213 with an opening. If the thickness of the sidewall 212 is overly small, the structural strength of the box 21 is relatively low, and the box is prone to deform under a force. If the thickness of the sidewall 212 is overly large, the sidewall 212 occupies a relatively large space, thereby being detrimental to the energy density and the grouping efficiency of the batteries 100. Designing the thickness of the sidewall 212 to fall within the range of 1 mm to 6 mm can improve the structural strength of the box 21, and improve the energy density and grouping efficiency of the batteries 100 that use the box 21.

In some embodiments, as shown in FIG. 5 to FIG. 7, along a direction perpendicular to the end wall 211, the maximum height of the box 21 is H1, satisfying: 50 mm≤H1≤300 mm.

Specifically, if, along a direction perpendicular to the end wall 211, the first flange portion 214 protrudes beyond an end, oriented away from the end wall 211, of the sidewall 212, then the maximum height of the box 21 is a dimension between an end, oriented away from the end wall 211, of the first flange portion 214 and an end, oriented away from the accommodation space 213, of the end wall 211.

If, along a direction perpendicular to the end wall 211, the first flange portion 214 does not protrude beyond the end, oriented away from the end wall 211, of the sidewall 212, then the maximum height of the box 21 is a dimension between an end, oriented away from the end wall 211, of the sidewall 212 and an end, oriented away from the accommodation space 213, of the end wall 211.

The maximum height H1 of the box 21 may be a value greater than or equal to 50 mm and less than or equal to 300 mm. For example, H1 may be 50 mm, 60 mm, 80 mm, 100 mm, 120 mm, 150 mm, 200 mm, 250 mm, or 285 mm.

In some embodiments, H1 may be a value greater than or equal to 100 mm and less than or equal to 300 mm. For example, H1 may be 110 mm, 130 mm, 140 mm, 160 mm, 170 mm, 180 mm, 190 mm, 210 mm, 220 mm, 260 mm, or 290 mm.

If the height of the box 21 is overly small, the accommodation space 213 of the box 21 is not enough to accommodate the battery cell 11, or can accommodate just small-sized battery cells 11. This increases the difficulty of the manufacturing process of the batteries 100 and is detrimental to the energy density of the battery 100 that uses the box 21. On the other hand, an excessive height of the box 21 is detrimental to the miniaturization and lightweight of the box 21, and may leave much redundant space in the box 21, thereby also being detrimental to the energy density of the battery 100 that uses the box 21. Designing the height of the box 21 to fall within the range of 50 mm to 300 mm is conducive to efficiently utilizing the space of the box 21 and increasing the energy density of the battery 100 that uses the box 21.

Figures 8, 9:
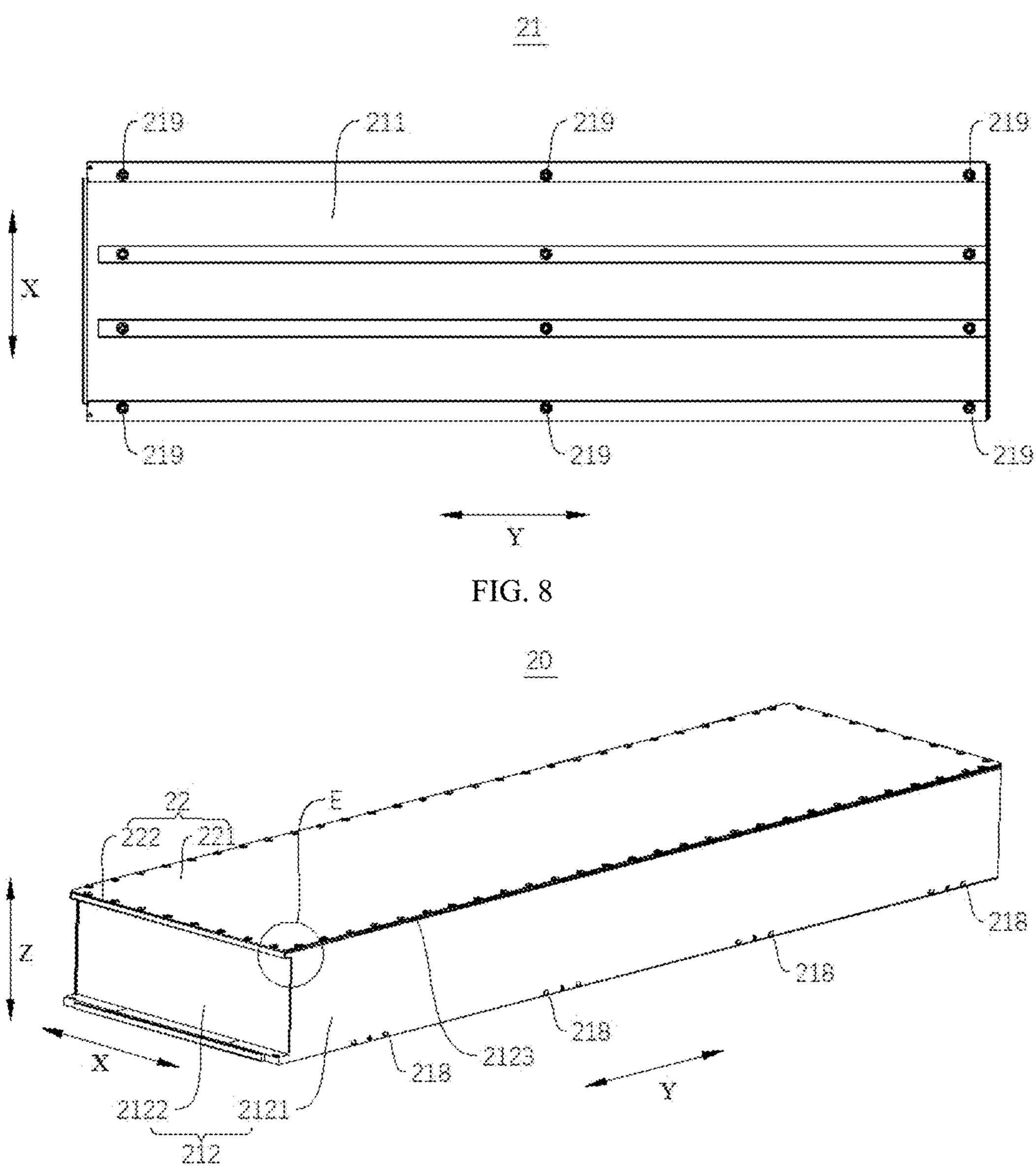
FIG. 8 is a bottom view of a box according to some embodiments of this application.
FIG. 9 is a schematic structural diagram of a box assembly according to some embodiments of this application.

In some embodiments, referring to FIG. 8, FIG. 8 is a bottom view of a box according to some embodiments of this application; and a mounting portion 219 configured to mount the box 21 onto an electrical device is disposed on the end wall 211.

The mounting portion 219 is configured to mount the box 21 to the electrical device. The mounting portion 219 may assume various structures. For example, the mounting portion 219 may be a fastener such as a snap ring or a stud disposed on the end wall 211. Alternatively, the mounting portion 219 may be a mounting hole created on the end wall 211.

Depending on the specifications of the battery 100, the mounting requirements, and other factors, one or more mounting portions 219 may be disposed. As an example, a plurality of columns of mounting portions 219 may be disposed on the end wall 211 and spaced apart, and a plurality of mounting portions 219 in each column are spaced apart to increase the force-bearing area and force balance on the base plate, and in turn, improve the stability and reliability of the battery 100 mounted onto the electrical device.

The mounting portion 219 is disposed on the end wall 211, thereby making it convenient to mount the box 21 onto the electrical device through the mounting portion 219. In addition, the mounting portion 219 is disposed on the end wall 211, thereby reducing the dimension by which the mounting portion 219 extends out of the box 21, and in turn, reducing the space occupied by the mounting portion 219 outside the box 21, and also increasing the energy density of the battery 100 that uses the box 21.

In some embodiments, still referring to FIG. 5 and FIG. 6, a flow channel 2111 configured to accommodate a heat exchange medium is disposed inside the end wall 211.

Specifically, the end wall 211 that accommodates the heat exchange medium can regulate the temperature of the battery cell 11 mounted in the accommodation space 213. The heat exchange medium is accommodated in the flow channel 2111 disposed inside the end wall 211. The heat exchange medium here may be a liquid or gas, and the temperature regulation means heating or cooling the battery cell 11. In a case of cooling down or lowering the temperature of the battery cell 11, the flow channel 2111 of the end wall 211 is configured to accommodate a cooling medium to lower the temperature of the battery cell 11. In this case, the end wall 211 is also referred to as a cooling component, a cooling system, a cooling plate, or the like. The heat exchange medium accommodated in the end wall is also referred to as a cooling medium, and more specifically, referred to as a cooling liquid or a cooling gas. In addition, the end wall 211 may be further configured to accommodate a heating medium to heat up the battery cell 11, without being limited herein. As an example, the flow channel 2111 of the end wall 211 accommodates a cooling liquid to cool down the battery cell 11.

The flow channel 2111 that accommodates the heat exchange medium is disposed inside the end wall 211. In this way, the end wall 211 can regulate the temperature of the battery cell 11 accommodated in the accommodation space 213, thereby improving the controllability and equalization of temperature of the batteries 100. In addition, this design improves the functional integration degree of the box 21, simplifies the structure of the battery 100, and increases the energy density of the battery 100.

In some embodiments, still referring to FIG. 3, a hoist hole 218 configured to hoist the box 21 is created on the sidewall 212.

Specifically, the hoist hole 218 may run through the sidewall 212 or may not run through the sidewall 212. The hoist hole 218 may be created at a position corresponding to the end wall 211 on the sidewall 212. In this case, the hoist hole 218 may extend into the end wall 211. Alternatively, the hoist hole 218 may be created at a position staggered from the end wall 211 on the sidewall 212.

A plurality of hoist holes 218 may be disposed. The plurality of hoist holes 218 may be spaced apart on the sidewall 212 to increase the number of hoist points of the battery 100 and improve the force balance of the battery 100.

In some embodiments, the sidewall 212 includes two first sidewalls 2121 disposed opposite to each other along the width direction (the X-direction shown in FIG. 3) of the box 21. A plurality of hoist holes 218 spaced apart are created on each of the first sidewalls 2121 along the length direction (the Y-direction shown in FIG. 3) of the box 21.

The hoist hole 218 created on the sidewall 212 facilitates the hoist and transportation of the box 21. In addition, the hoist hole 218 does not occupy additional space of the box 21 in the length or width direction, thereby also increasing the energy density of the battery 100.

Figure 10:
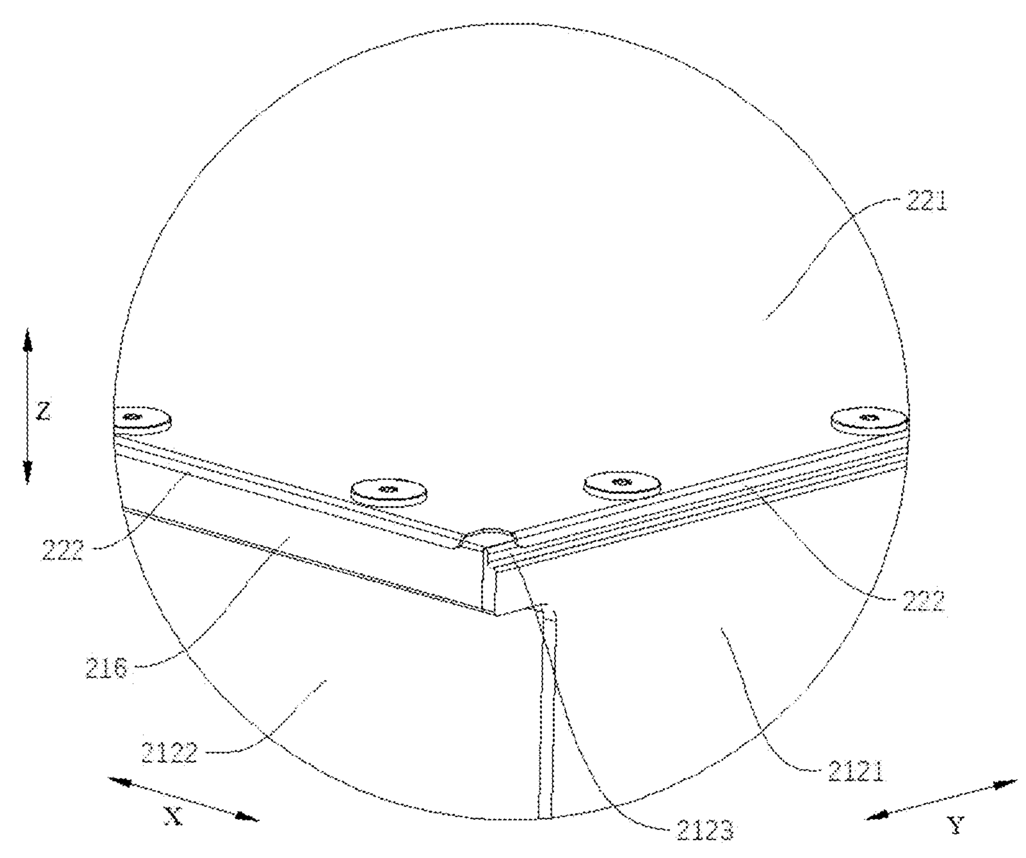
FIG. 10 is a close-up view of a part E shown in FIG. 9.
Figure 11:
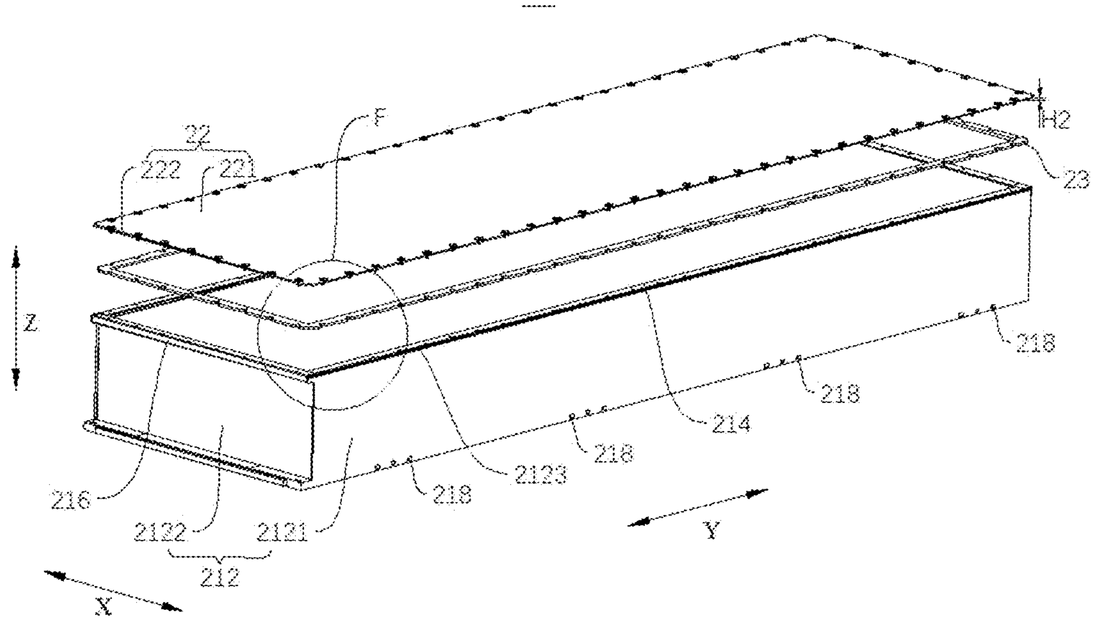
FIG. 11 is an exploded view of a box assembly according to some embodiments of this application.
Figure 12:
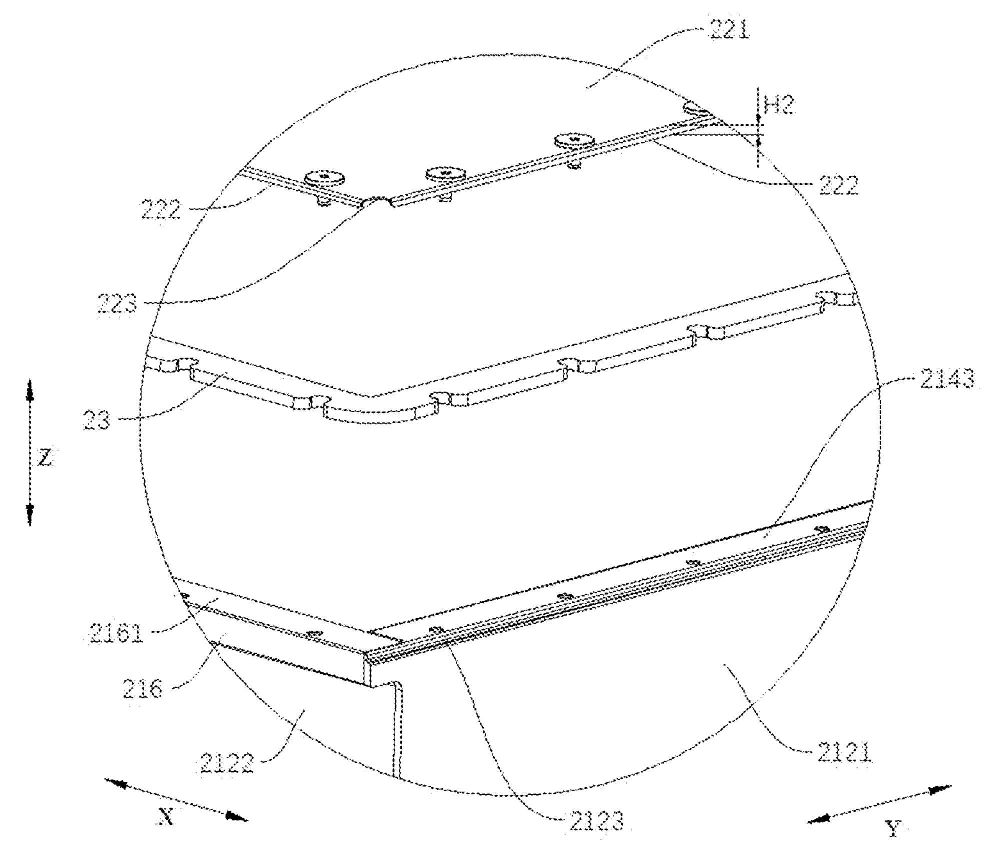
FIG. 12 is a close-up view of a part F shown in FIG. 11.

Referring to FIG. 2 to FIG. 8 together with FIG. 9 to FIG. 12, FIG. 9 is a schematic structural diagram of a box assembly according to some embodiments of this application; FIG. 10 is a close-up view of a part E shown in FIG. 9; FIG. 11 is an exploded view of a box assembly according to some embodiments of this application; and FIG. 12 is a close-up view of a part F shown in FIG. 11, some embodiments of this application further provide a box assembly 20. The box assembly 20 includes a box 21 and a cover 22. The box 21 may be the box 21 according to any one of the above embodiments. The cover 22 is configured to cover the opening of the box 21 and be connected to the first flange portion 214.

As mentioned earlier, the cover 22 is configured to cover the opening of the box 21 and be connected to the first flange portion 214, and the cover 22 may assume a flat plate structure. The cover 22 fits the opening of the box 21 so that the box 21 and the cover 22 jointly define an assembling space. Alternatively, the cover 22 is also a hollow structure opened at one end, and the opening of the box 21 fits the opening of the cover 22.

The shape of the cover 22 may match the shape of the box 21, or may not match the shape of the box 21. For example, the box 21 assumes a hexahedral structure, and the cover 22 assumes a rectangular plate structure that matches the opening of the box 21.

In some embodiments, the cover 22 and the box 21 may be detachably connected by screwing, riveting, snap-fitting, or other means. Alternatively, in some other embodiments, the cover 22 and the box 21 may be supplied separately, and the cover 22 and the box 21 may be welded to each other after the battery is assembled.

In some embodiments, the cover 22 is riveted or screwed to the first flange portion 214. This facilitates disassembling and assembling, achieves high stability of connection, and facilitates grouping of the box assembly 20.

The box assembly 20 includes a box 21 and a cover 22. The cover 22 is connected to the first flange portion 214, so that the cover 22 can seal the opening of the accommodation space 213 and isolate the accommodation space 213 from the external environment, thereby improving the hermeticity of the box 21.

In some embodiments, as shown in FIG. 9 to FIG. 12, the cover 22 includes a body portion 221 and a flanged portion 222. The body portion 221 is configured to cover the opening and be connected to the first flange portion 214. The body portion 221 includes a first surface 223 oriented toward the opening. The flanged portion 222 extends from an edge of the body portion 221 toward the end wall 211. The flanged portion 222 is configured to cover at least a part of an outer surface of the sidewall 212.

Specifically, the flanged portion 222 may extend toward the end wall 211 for a specified length. After the cover 22 fits onto the box 21, the flanged portion 222 can cover just a part of the outer surface of the sidewall 212. Alternatively, the flanged portion 222 may extend toward the end wall 211 until the end wall 211 or beyond the end wall 211. After the cover 22 fits onto the box 21, the flanged portion 222 can fully cover the sidewall 212.

In addition, the number of flanged portions 222 may be one, and the one flanged portion 222 may extend along a circumferential direction of the body portion 221 to form a closed-loop structure. Alternatively, the one flanged portion 222 may be formed on just a part of the edge of the body portion 221, that is, the flanged portion 222 does not extend along the circumferential direction of the body portion 221 to form a closed-loop structure. Alternatively, the number of flanged portions 222 may be plural, and the plurality of flanged portions 222 may be spaced apart along the circumferential direction of the body portion 221. The extension lengths of the plurality of flanged portions 222 extending toward the end wall 211 may be the same or different.

The cover 22 includes a body portion 221 covering the opening of the box 21 and a flanged portion 222 extending from the edge of the body portion 221. The flanged portion 222 extends toward the end wall 211. The flanged portion 222 can at least partially cover the outer surface of the sidewall 212 of the box 21 after the cover 22 fits onto the opening of the box 21. The flanged portion 222 serves to guide the fit between the box 21 and the cover 22 and assist in sealing the box.

In some embodiments, a groove 2123 is created on the outer surface of the sidewall 212. The flanged portion 222 is at least partially accommodated in the groove 2123.

Specifically, on the outer surface of the sidewall 212, the groove 2123 may be created at all positions corresponding to the flanged portion 222, and the groove 2123 may extend to an end of the sidewall 212, the end being oriented toward the first surface 223.

The flanged portion 222 may be fully accommodated in the groove 2123 or just partially accommodated in the groove 2123. Specifically, the depth of the groove 2123 may be greater than the thickness of the flanged portion 222.

After the flanged portion 222 is accommodated in the groove 2123, the flanged portion 222 does not protrude beyond the outer surface of the sidewall 212. Alternatively, the depth of the groove 2123 may be less than the thickness of the flanged portion 222. A side, oriented away from the sidewall 212, of the flanged portion 222 protrudes beyond the outer surface of the sidewall 212 after the flanged portion 222 is accommodated in the groove 2123.

As an example, the depth of the groove 2123 is greater than the thickness of the flanged portion 222. After the flanged portion 222 is accommodated in the groove 2123, the flanged portion 222 does not protrude beyond the outer surface of the sidewall 212.

In addition, on the outer surface of the sidewall 212, the groove 2123 may not be created at a position corresponding to a part of the flanged portion 222. In this way, along the circumferential direction of the body portion 221, a part of the flanged portion 222 may be accommodated in the positionally corresponding groove 2123; and no groove 2123 is created at positions corresponding to another part of the flanged portion 222, and this part of flanged portion 222 is not accommodated in the groove 2123.

The groove 2123 is created on the outer surface of the sidewall 212. The flanged portion 222 is partially or fully accommodated in the groove 2123. The groove 2123 can reduce the dimension by which the flanged portion 222 protrudes beyond the outer surface of the sidewall 212, or prevent the flanged portion 222 from protruding beyond the outer surface of the sidewall 212, thereby reducing the space occupied by the flanged portion 222 separately outside the box 21, or preventing the flanged portion 222 from occupying the space outside the box 21 separately. The flanged portion 222 and the sidewall 212 share a part of the transverse space of the box 21, thereby further improving the energy density and grouping efficiency of the battery 100 that uses the box 21.

In some embodiments, as shown in FIG. 9 to FIG. 12, the sidewall 212 includes two first sidewalls 2121 disposed opposite to each other along a first direction X and two second sidewalls 2122 disposed opposite to each other along a second direction Y. The first direction X is perpendicular to the second direction Y. The first flange portion 214 is disposed at an end of the first sidewalls 2121, the end being away from the end wall 211. The groove 2123 is created on the outer surface of the first sidewall 2121.

To be specific, the two first sidewalls 2121, the two second sidewalls 2122, and the end wall 211 close in together to form a hollow structure opened at one end. The two first sidewalls 2121 are disposed opposite to each other along a first direction X. The two second sidewalls 2122 are disposed opposite to each other along a second direction Y. The first direction X, the second direction Y, and the thickness direction of the end wall 211 are perpendicular to each other. The entire box 21 forms a hexahedral structure opened on one side.

The first flange portion 214 is disposed at an end of the first sidewall 2121, the end being away from the end wall 211. In other words, two first flange portions 214 may be disposed, and the first flange portion 214 is disposed at one end of each of the two first sidewalls 2121, the end being away from the end wall 211. The two first flange portions 214 are disposed on two opposite sides of the box 21 along the first direction X.

In addition, a groove 2123 is created on the outer surface of each first sidewall 2121, so that the flanged portion 222 covering the outer surface of the first sidewall 2121 can be accommodated in the groove 2123.

The flanged portion 222 and the first sidewall 2121 share a part of the space of the box 21 along the first direction X. This makes it convenient for the battery cell 11 to efficiently utilize the space of the box 21 in the first direction X, and improves the energy density and grouping efficiency of the batteries 100 that use the box 21.

In some embodiments, as shown in FIG. 11 to FIG. 12, along a direction perpendicular to the end wall 211, the maximum height of the cover 22 is H2, satisfying: H2≤10 mm.

Specifically, the maximum height of the cover 22 means a minimum linear distance between a position farthest away from the end wall 211 on the cover 22 and a position closest to the end wall 211 on the cover 22 along a direction perpendicular to the end wall 211 (the Z-direction shown in FIG. 11).

For example, based on the implementation in which "the cover 22 includes a body portion 221 and a flanged portion 222", the maximum height H2 of the cover 22 means a distance between an end, oriented away from the end wall 211, of the body portion 221 and an end, oriented toward the end wall 211, of the flanged portion 222 along the direction perpendicular to the end wall 211 (Z-direction).

The maximum height H2 of the cover 22 may be a value less than or equal to 10 mm, for example, 10 mm, 9 mm, 8 mm, 7 mm, 6 mm, 5 mm, 4 mm, 3 mm, 2 mm, or 1 mm.

The larger the height of the cover 22, the more space the cover occupies, and the more space is wasted by the battery 100 that uses the box 21. Designing the maximum height of the cover 22 to fall within 10 mm can reduce the waste of space of the box 21 caused by the cover 22, thereby improving the energy density and grouping efficiency of the batteries 100 that use the box 21.

In some embodiments, as shown in FIG. 11, the box assembly 20 further includes a sealing element 23. At least a part of the sealing element 23 is disposed between the cover 22 and the first flange portion 214.

The sealing element 23 may be in various forms. For example, the sealing element 23 may be a separately disposed sealing ring structure. The sealing ring is embedded between the first flange portion 214 and the cover 22 to implement hermetic connection between the cover 22 and the box 21.

For another example, the sealing element 23 may be a sealant layer. The sealant is applied between the first flange portion 214 and the cover 22. The sealant forms a sealant layer, and the sealant layer implements hermetic connection between the cover 22 and the box 21.

The sealing element 23 is disposed between the cover 22 and the first flange portion 214 of the box 21 to implement hermetic connection between the cover 22 and the box 21, thereby improving the sealing performance of the grouped batteries 100.

Some embodiments of this application further provide a battery 100, including a plurality of battery cells 11 and a box assembly 20. The box assembly 20 may be the box assembly 20 disclosed in any one of the foregoing technical solutions. The plurality of battery cells 11 are disposed in the accommodation space 213 of the box assembly 20.

As mentioned earlier, the plurality of battery cells 11 may be connected in series, parallel, or series-and-parallel pattern. The series-and-parallel pattern means a combination of series connection and parallel connection of the plurality of battery cells 11. The plurality of battery cells 11 may be directly connected in series, parallel, or series-and-parallel pattern, and then the whole of the plurality of battery cells 11 may be accommodated in the box assembly 20. Alternatively, the plurality of battery cells 11 may be connected in series, parallel, or series-and-parallel pattern to form a battery module 10 first, and then a plurality of battery modules 10 are connected in series, parallel, or series-and-parallel pattern to form a whole and accommodated in the box assembly 20.

Figure 13:
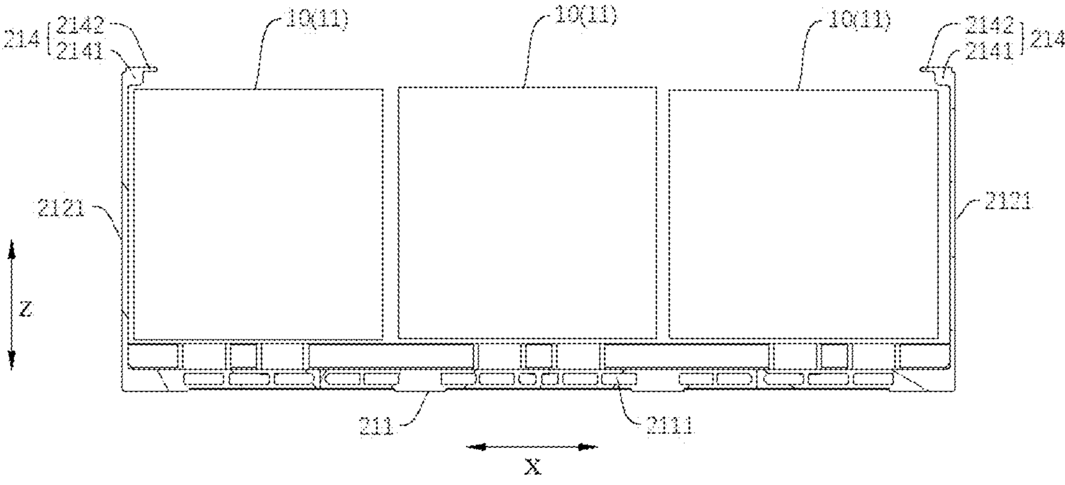
FIG. 13 is a cross-sectional schematic view of battery modules mounted in a box according to some embodiments of this application.

In some embodiments, referring to FIG. 3 together with FIG. 13, FIG. 13 is a cross-sectional schematic view of battery modules mounted in a box according to some embodiments of this application. A plurality of battery cells 11 form a battery module 10. At least three battery modules 10 are disposed in parallel along a direction parallel to the end wall 211.

Specifically, at least three battery modules 10 are arranged in the accommodation space 213 along the direction parallel to the end wall 211. To be specific, three, four, or even more battery modules 10 may be arranged in the accommodation space 213 along the direction parallel to the end wall 211.

As an example, as shown in FIG. 11 and FIG. 13, the box 21 includes an end wall 211, a sidewall 212, and a first flange portion 214. The sidewall 212 encloses the end wall 211 peripherally. The sidewall 212 and the end wall 211 close in together to form an accommodation space 213 with an opening. The sidewall 212 includes two first sidewalls 2121 disposed opposite to each other along a first direction X and two second sidewalls 2122 disposed opposite to each other along a second direction Y. The first direction X is perpendicular to the second direction Y. The first flange portion 214 is disposed at an end of the first sidewalls 2121, the end being away from the end wall 211. At least a part of the first flange portion 214 protrudes beyond an inner surface of the first sidewalls 2121.

Along the first direction X, three battery modules 10 are arranged in the accommodation space 213.

In mounting the battery modules 10 into the box 21, the battery modules 10 may be pushed laterally into the box 21. Specifically, a first battery module 10 may be moved into the box 21 first along a direction perpendicular to the end wall 211 (Z-direction) so that the battery module 10 enters the accommodation space 213. Subsequently, the battery module 10 that enters the accommodation space 213 is moved along a first direction X, so that the first battery module 10 approaches one of the first sidewalls 2121. A part of the battery module 10 is able to be located below a first flange portion 214 connected to the first sidewall 2121. Subsequently, a second battery module 10 is loaded into the box 21 in the same way as the first battery module 10, and the second battery module 10 is made to approach a second first sidewall 2121. A part of the battery module 10 can be located below the first flange portion 214 connected to the first sidewall 2121. Afterward, a third battery module 10 is moved along a direction perpendicular to the end wall 211 (Z-direction) so as to be fitted between the first battery module 10 and the second battery module 10.

At least three battery modules 10 are arranged in parallel along a direction parallel to the end wall 211 in the accommodation space 213. In this way, the dimension of the opening of the accommodation space 213 is much larger than the dimension of the battery modules 10. The battery modules 10 can avoid the box 21 mutually when being mounted into the box 21, thereby reducing the possibility of the first flange portion 214 interfering with the mounting of the battery modules 10, facilitating efficient utilization of the accommodation space 213 of the box 21, reducing the waste of space within the box 21, and also improving the energy density and grouping efficiency of the batteries 100 that use the box 21.

In some embodiments, as shown in FIG. 13, viewed along a direction perpendicular to the end wall 211, the first flange portion 214 overlaps at least a part of battery cells 11 among the plurality of battery cells 11 to form an overlap region.

In other words, after the battery cells 11 are mounted into the box 21, a part of the battery cells 11 and the first flange portion 214 can share a part of space in the box 21 in a direction parallel to the end wall 211, thereby further increasing the rate of occupancy of the accommodation space 213 of the box 21 by the battery cells 11, reducing the waste of space below the first flange portion 214 in the accommodation space 213, and improving the energy density and grouping efficiency of the batteries 100 that use the box 21.

Some embodiments of this application further provide an electrical device. The electrical device includes the battery 100 disclosed in any one of the foregoing technical solutions. The battery 100 is configured to provide electrical energy.

The electrical device may be any one of the foregoing devices or systems that use the battery 100.

Referring to FIG. 3 to FIG. 8, some embodiments of this application provide a box assembly 20. The box assembly 20 includes a box 21 and a cover 22. The box 21 includes an end wall 211, a sidewall 212, a first flange portion 214, a second flange portion 216, and a third flange portion 217. The sidewall 212 encloses the end wall 211 peripherally. The sidewall 212 and the end wall 211 jointly define an accommodation space 213 with an opening. The sidewall 212 includes two first sidewalls 2121 disposed opposite to each other along a first direction X and two second sidewalls 2122 disposed opposite to each other along a second direction Y. The first direction X, the second direction Y, and the thickness direction of the end wall 211 (the third direction Z) are perpendicular to each other. The dimension of the end wall 211 in the first direction X is less than the dimension of the end wall in the second direction Y. The first flange portion 214 is disposed at an end of the first sidewall 2121, the end being away from the end wall 211. The first flange portion 214 at least partially protrudes beyond an inner surface of the first sidewall 2121. The second flange portion 216 extends outward from an end of one of the second sidewalls 2122, the end being away from the end wall 211. The third flange portion 217 is disposed at an end of the other second sidewall 2122, the end being away from the end wall 211. The third flange portion 217 at least partially protrudes beyond an inner surface of the other second sidewall 2122.

The first flange portion 214 includes a first flange face 2143 oriented away from the end wall 211. The first flange portion 214 includes a first sub-portion 2141 and a second sub-portion 2142. The first sub-portion 2141 is connected to the second sub-portion 2142 and the sidewall 212. Along a direction perpendicular to the first flange face 2143, a thickness of the first sub-portion 2141 is greater than a thickness of the second sub-portion 2142. A threaded hole 215 is created on the first sub-portion 2141.

The cover 22 is configured to cover the opening and be threadedly connected to the first flange portion 214. The cover 22 includes a body portion 221 and a flanged portion 222. The body portion 221 is configured to cover the opening and be connected to the first flange portion 214. The body portion 221 includes a first surface 223 oriented toward the opening. The flanged portion 222 extends from an edge of the body portion 221 toward the end wall 211. The flanged portion 222 is configured to cover at least a part of an outer surface of the sidewall 212. A groove 2123 is created on the outer surface of the first sidewall 2121. The flanged portion 222 is at least partially accommodated in the groove 2123.

Referring to FIG. 3 to FIG. 13, some embodiments of this application provide a battery 100, including a box assembly 20 and a plurality of battery cells 11. The box assembly 20 includes a box 21 and a cover 22. The box 21 includes an end wall 211, a sidewall 212, a first flange portion 214, a second flange portion 216, and a third flange portion 217. The sidewall 212 encloses the end wall 211 peripherally. The sidewall 212 and the end wall 211 jointly define an accommodation space 213 with an opening. The sidewall 212 includes two first sidewalls 2121 disposed opposite to each other along a first direction X and two second sidewalls 2122 disposed opposite to each other along a second direction Y. The first direction X, the second direction Y, and the thickness direction of the end wall 211 (the third direction Z) are perpendicular to each other. The dimension of the end wall 211 in the first direction X is less than the dimension of the end wall in the second direction Y. The first flange portion 214 is disposed at an end of the first sidewall 2121, the end being away from the end wall 211. The first flange portion 214 at least partially protrudes beyond an inner surface of the first sidewall 2121. The second flange portion 216 extends outward from an end of one of the second sidewalls 2122, the end being away from the end wall 211. The third flange portion 217 is disposed at an end of the other second sidewall 2122, the end being away from the end wall 211. The third flange portion 217 at least partially protrudes beyond an inner surface of the other second sidewall 2122.

The first flange portion 214 includes a first flange face 2143 oriented away from the end wall 211. The first flange portion 214 includes a first sub-portion 2141 and a second sub-portion 2142. The first sub-portion 2141 is connected to the second sub-portion 2142 and the sidewall 212. Along a direction perpendicular to the first flange face 2143, a thickness of the first sub-portion 2141 is greater than a thickness of the second sub-portion 2142. A threaded hole 215 is created on the first sub-portion 2141.

The cover 22 is configured to cover the opening and be threadedly connected to the first flange portion 214. The cover 22 includes a body portion 221 and a flanged portion 222. The body portion 221 is configured to cover the opening and be connected to the first flange portion 214. The body portion 221 includes a first surface 223 oriented toward the opening. The flanged portion 222 extends from an edge of the body portion 221 toward the end wall 211. The flanged portion 222 is configured to cover at least a part of an outer surface of the sidewall 212. A groove 2123 is created on the outer surface of the first sidewall 2121. The flanged portion 222 is at least partially accommodated in the groove 2123.

The plurality of battery cells 11 are connected in series, parallel, or series-and-parallel pattern to form a battery module 10 first, and then a plurality of battery modules 10 are connected in series, parallel, or series-and-parallel pattern to form an entirety that is to be accommodated in the box assembly 20. Along the first direction X, three battery modules 10 are arranged in the accommodation space 213. Viewed along a direction perpendicular to the end wall 211, the first flange portion 214 overlaps at least a part of battery cells 11 in the battery module 10 to form an overlap region.

In assembling the battery 100, the battery modules 10 may be pushed laterally into the box 21. Specifically, a first battery module 10 may be moved into the box 21 first along a direction perpendicular to the end wall 211 so that the battery module 10 enters the accommodation space 213. Subsequently, the battery module 10 that enters the accommodation space 213 is moved along a first direction X, so that the first battery module 10 approaches one of the first sidewalls 2121. A part of the battery module 10 is able to be located below a first flange portion 214 connected to the first sidewall 2121. Subsequently, a second battery module 10 is loaded into the box 21 in the same way as the first battery module 10, and the second battery module 10 is made to approach a second first sidewall 2121. A part of the battery module 10 can be located below the first flange portion 214 connected to the first sidewall 2121. Afterward, a third battery module 10 is loaded into the accommodation space 213 along a direction perpendicular to the end wall 211 and positioned between the first battery module 10 and the second battery module 10. Finally, the cover 22 is fitted onto the box 21, and the body portion 221 of the cover 22 is connected to the first flange portion 214, the second flange portion 216, and the third flange portion 217.

In some embodiments, before the cover 22 is connected to the box 21, a sealing element 23 (sealing ring or sealant) may be arranged on the first flange portion 214, the second flange portion 216, and the third flange portion 217. Finally, the cover 22 and the sealing element 23 are mounted so that the cover 22 is hermetically connected to the box 21.

Although this application has been described with reference to exemplary embodiments, various improvements may be made to the embodiments without departing from the scope of this application, and some components described in the embodiments may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A box, wherein the box comprises:

an end wall;

a sidewall, wherein the sidewall encloses the end wall peripherally, and the sidewall and the end wall jointly define an accommodation space with an opening; and a first flange portion, wherein the first flange portion is disposed at an end of the sidewall, the end being away from the end wall, and the first flange portion at least partially protruding beyond an inner surface of the sidewall, wherein the first flange portion comprises a first flange face oriented away from the end wall, the first flange portion comprises a first sub-portion and a second sub-portion, the first sub-portion is connected to the second sub-portion and the sidewall, and, along a direction parallel to the sidewall face, a thickness of the first sub-portion is greater than a thickness of the second sub-portion; and a threaded hole is created on the first sub-portion, wherein a mounting portion configured to mount the box onto an electrical device is disposed on the end wall, and wherein a flow channel configured to accommodate a heat exchange medium is disposed inside the end wall.

2. The box according to claim 1, wherein the first flange portion and the sidewall are formed in one piece.

3. The box according to claim 1, wherein a threaded hole is created on the first flange portion.

4. The box according to claim 1, wherein the first flange portion comprises a first flange face oriented away from the end wall, and a width of the first flange face is D, satisfying: 10 mm≤D≤30 mm.

5. The box according to claim 1, wherein the sidewall comprises two first sidewalls disposed opposite to each other along a first direction and two second sidewalls disposed opposite to each other along a second direction, the first direction is perpendicular to the second direction, and the first flange portion is disposed at an end of the first sidewalls, the end being away from the end wall.

6. The box according to claim 5, wherein the box further comprises:

a second flange portion, wherein the second flange portion extends outward from an end of one of the second sidewalls, the end being away from the end wall.

7. The box according to claim 6, wherein the box further comprises:

a third flange portion, wherein the third flange portion is disposed at an end of the other second sidewall, the end being away from the end wall, and the third flange portion at least partially protruding beyond an inner surface of the other second sidewall.

8. The box according to claim 5, wherein a dimension of the end wall in the first direction is less than a dimension of the end wall in the second direction.

9. The box according to claim 1, wherein a thickness of the sidewall is T, satisfying: 1 mm≤T≤6 mm.

10. The box according to claim 1, wherein, along a direction perpendicular to the end wall, a maximum height of the box is H1, satisfying: 50 mm≤H1≤300 mm.

11. The box according to claim 1, wherein a hoist hole configured to hoist the box is created on the sidewall.

12. A box assembly, comprising:

the box according to claim 1; and a cover, configured to cover the opening and be connected to the first flange portion;

wherein the cover comprises:

a body portion, configured to cover the opening and be connected to the first flange portion, wherein the body portion comprises a first surface oriented toward the opening; and a flanged portion, extending from an edge of the body portion toward the end wall, wherein the flanged portion is configured to cover at least a part of an outer surface of the sidewall.

13. The box assembly according to claim 12, wherein a groove is created on the outer surface of the sidewall, and the flanged portion is at least partially accommodated in the groove; and the sidewall comprises two first sidewalls disposed opposite to each other along a first direction and two second sidewalls disposed opposite to each other along a second direction, the first direction is perpendicular to the second direction, and the first flange portion is disposed at an end of the first sidewalls, the end being away from the end wall; and the groove is created on an outer surface of the first sidewalls.

14. The box assembly according to claim 12, wherein, along a direction perpendicular to the end wall, a maximum height of the cover is H2, satisfying: H2≤10 mm;

the cover is riveted or screwed to the first flange portion; and the box assembly further comprises a sealing element, and at least a part of the sealing element is disposed between the cover and the first flange portion.

15. A battery, comprising:

the box assembly according to claim 12;

a plurality of battery cells, disposed in the accommodation space;

the plurality of battery cells form a battery module, and at least three battery modules are disposed in parallel along a direction parallel to the end wall; and viewed along a direction perpendicular to the end wall, the first flange portion overlaps at least a part of the plurality of battery cells to form an overlap region.

16. An electrical device, comprising the battery according to claim 15, wherein the battery is configured to provide electrical energy.

* * * * *